United States Patent [19]

Duren

[11] Patent Number: 5,281,773
[45] Date of Patent: * Jan. 25, 1994

[54] CONTROLLED PHASE MARINE SOURCE SUBARRAY

[75] Inventor: Richard E. Duren, Spring, Tex.

[73] Assignee: Exxon Production Research Company, Houston, Tex.

[*] Notice: The portion of the term of this patent subsequent to Aug. 25, 2009 has been disclaimed.

[21] Appl. No.: 900,021

[22] Filed: Jun. 17, 1992

Related U.S. Application Data

[63] Continuation-in-part of Ser. No. 751,295, Aug. 28, 1991, Pat. No. 5,142,498.

[51] Int. Cl.$^5$ .............................................. G01V 1/38
[52] U.S. Cl. ....................................... 181/111; 367/15; 367/153
[58] Field of Search .................. 367/20, 153, 154, 15, 367/23; 181/110, 111, 112, 118

[56] References Cited

U.S. PATENT DOCUMENTS

| | | | |
|---|---|---|---|
| 4,146,870 | 3/1979 | Ruehle | 367/23 |
| 4,721,180 | 1/1988 | Haughland et al. | 367/16 |
| 4,727,956 | 3/1988 | Huizer | 367/23 |
| 4,956,822 | 9/1990 | Barber et al. | 367/23 |
| 5,142,498 | 8/1992 | Duren | 367/15 |

FOREIGN PATENT DOCUMENTS 320073 6/1989 European Pat. Off. .

OTHER PUBLICATIONS

"A Theory for Marine Source Arrays", by Richard E. Duren, Geophysics, vol. 53, No. 5, pp. 650-658 [May 1988].
"Why Don't We Measure Seismic Signatures?", by A. Ziokowski, Geophysics, vol. 56, No. 2, pp. 190-201 [Feb. 1991].

Primary Examiner—Daniel T. Pihulic
Attorney, Agent, or Firm—Keith A. Bell; Darcell Walker

[57] ABSTRACT

Controlled phase marine seismic subarray for use in a marine seismic array and methods for constructing such subarray are provided. A controlled phase marine seismic subarrays of the present invention are arranged to operate at a preselected depth and to provide generally downgoing (for angles of emergence from the array that are of interest) far-field pulses having phase spectra that match the phase spectrum of the vertically downgoing far-field pulse up to a ghost-notch frequency. The methods select the depth of operation and type of sources for the subarray, select a maximum number of identical elements and spacing based upon the highest incidence angle and frequency for which phase control is desired, and construct a plurality of parallel, linear, subarrays.

19 Claims, 15 Drawing Sheets

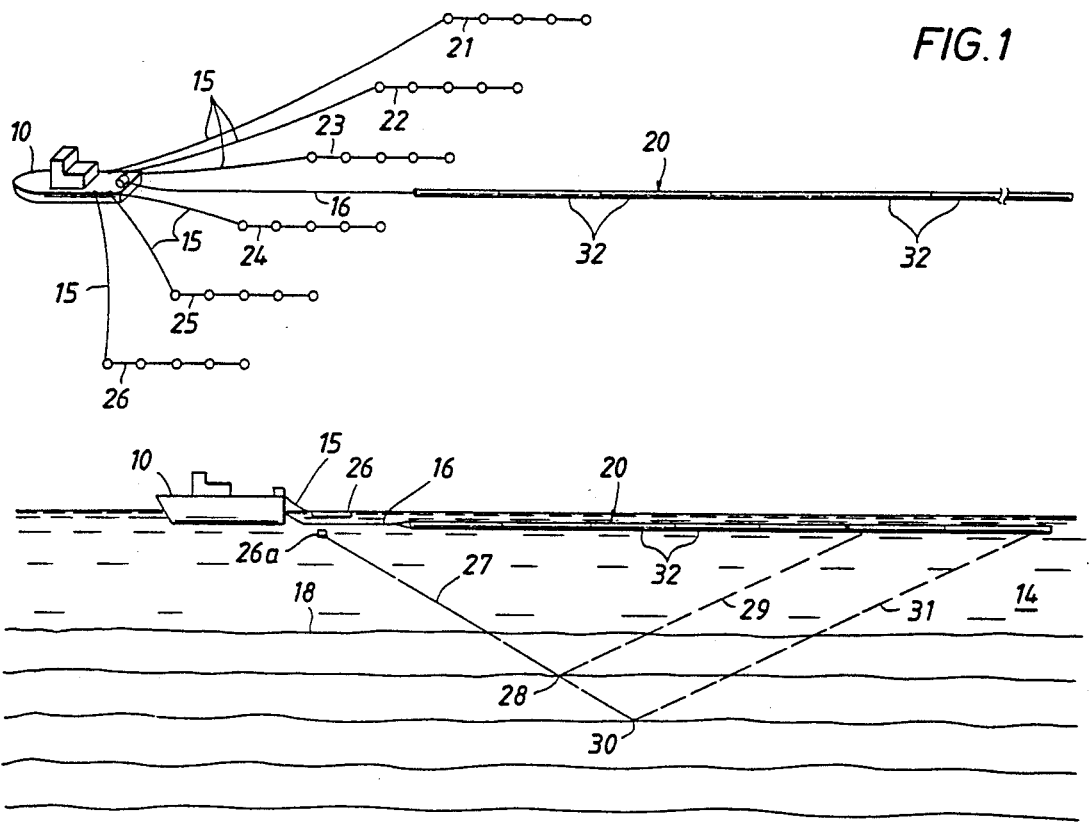
FIG.1
FIG.2
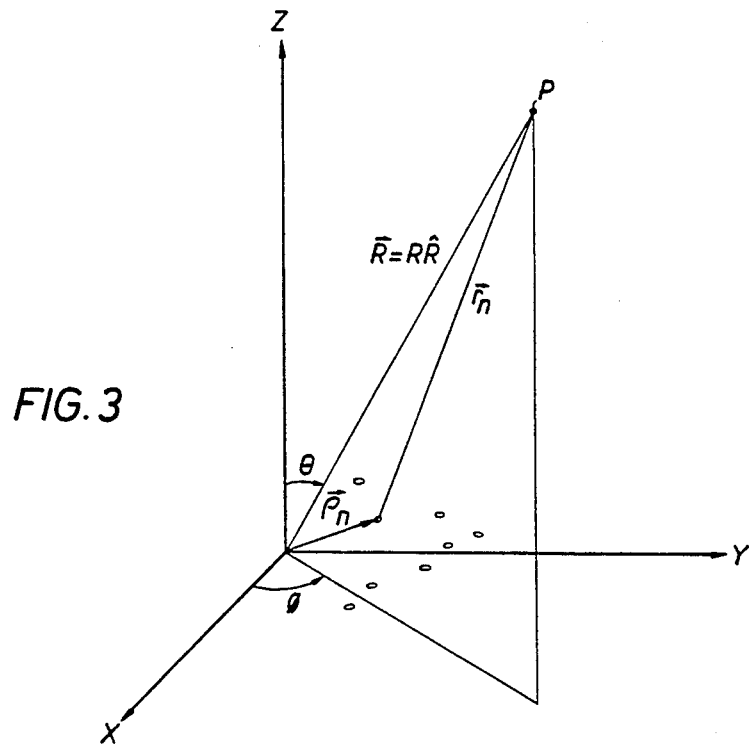
FIG.3

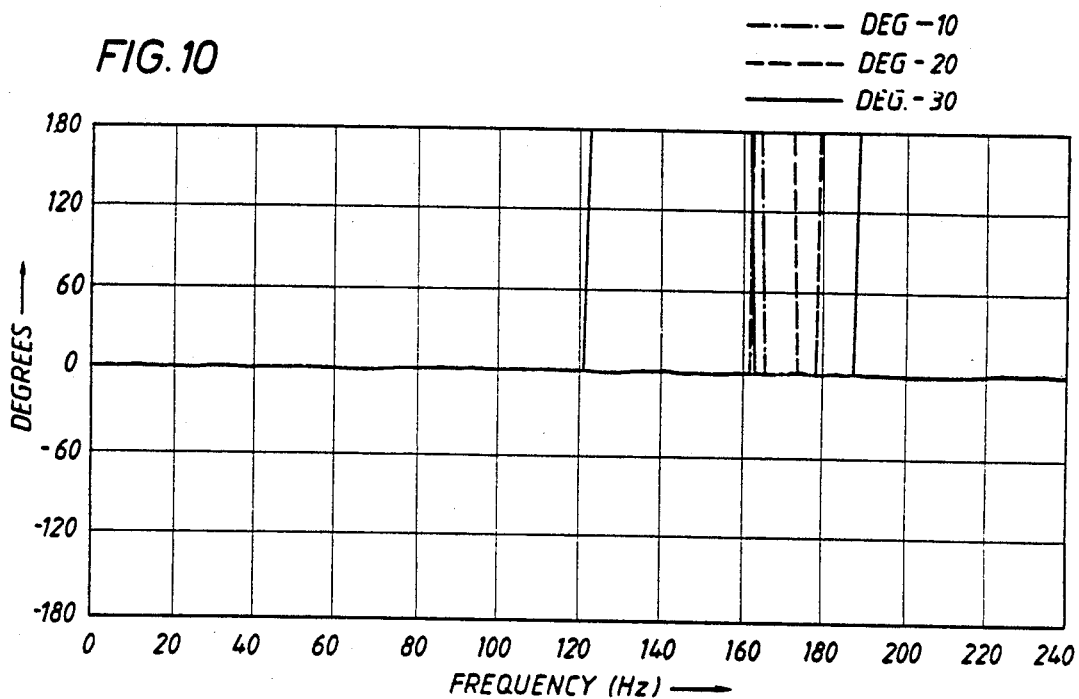
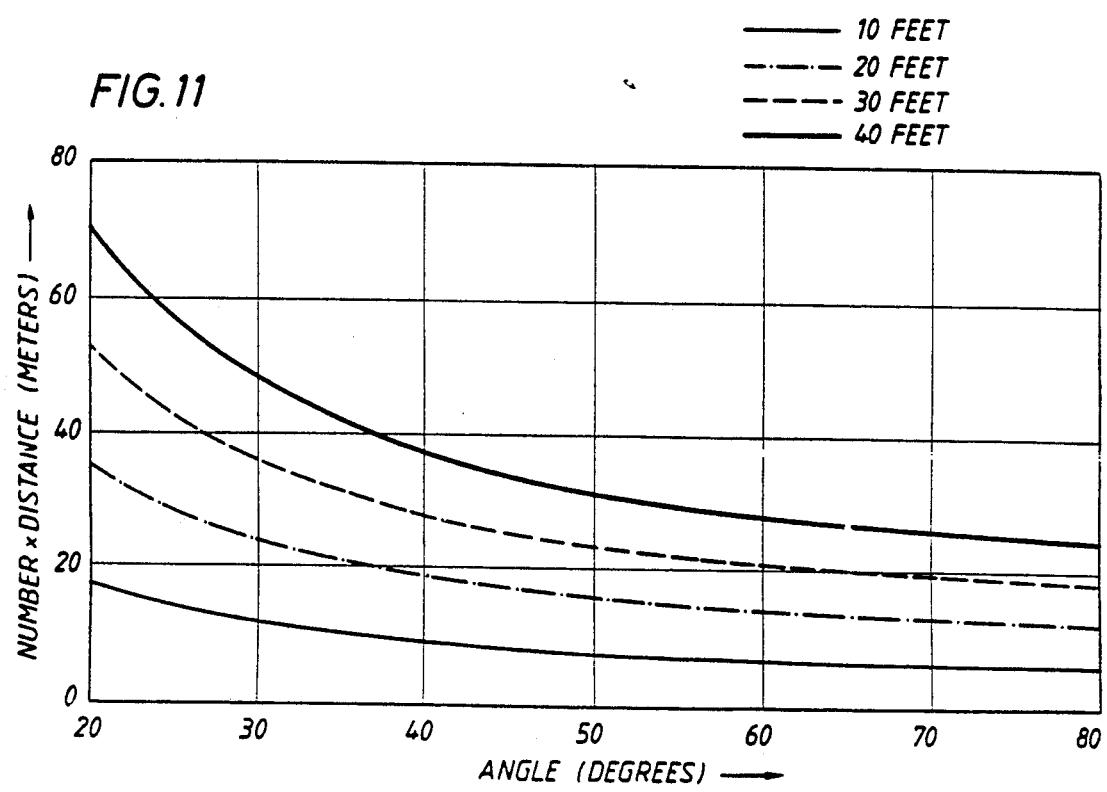

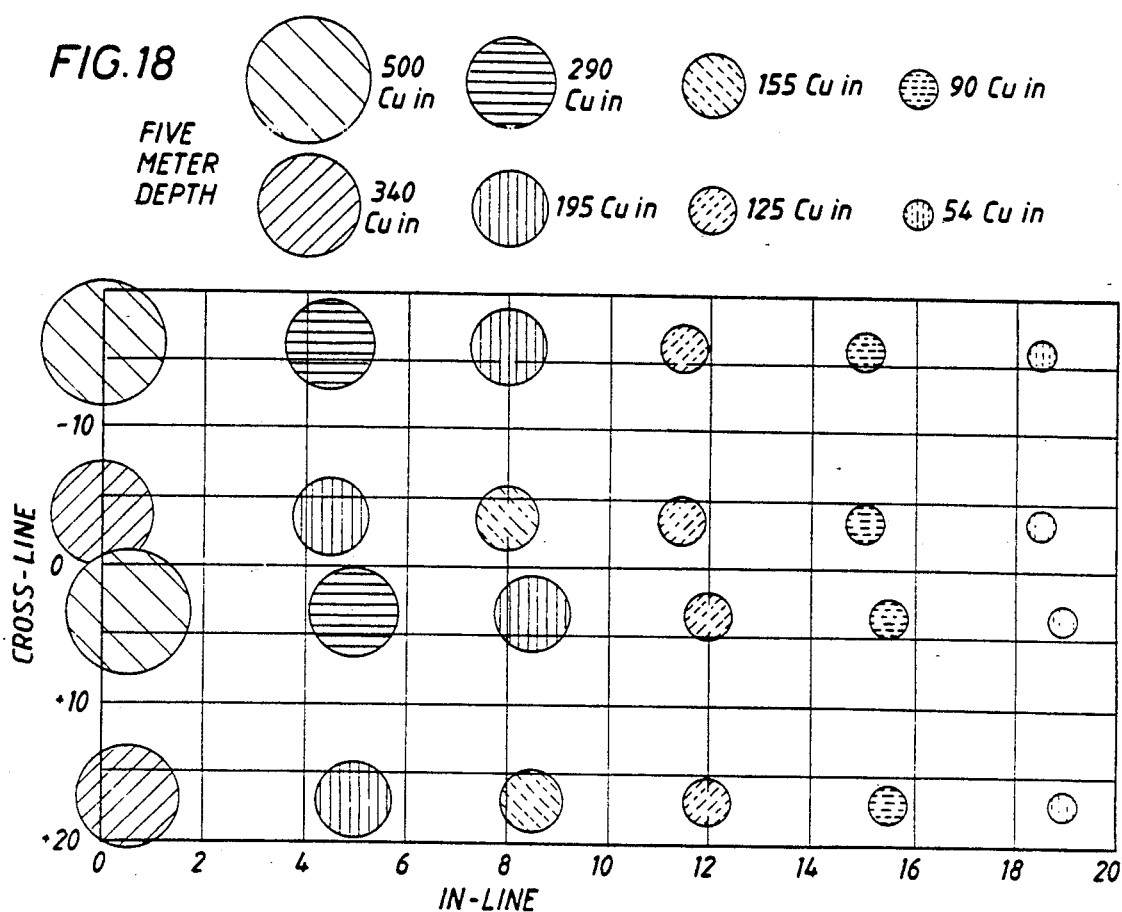
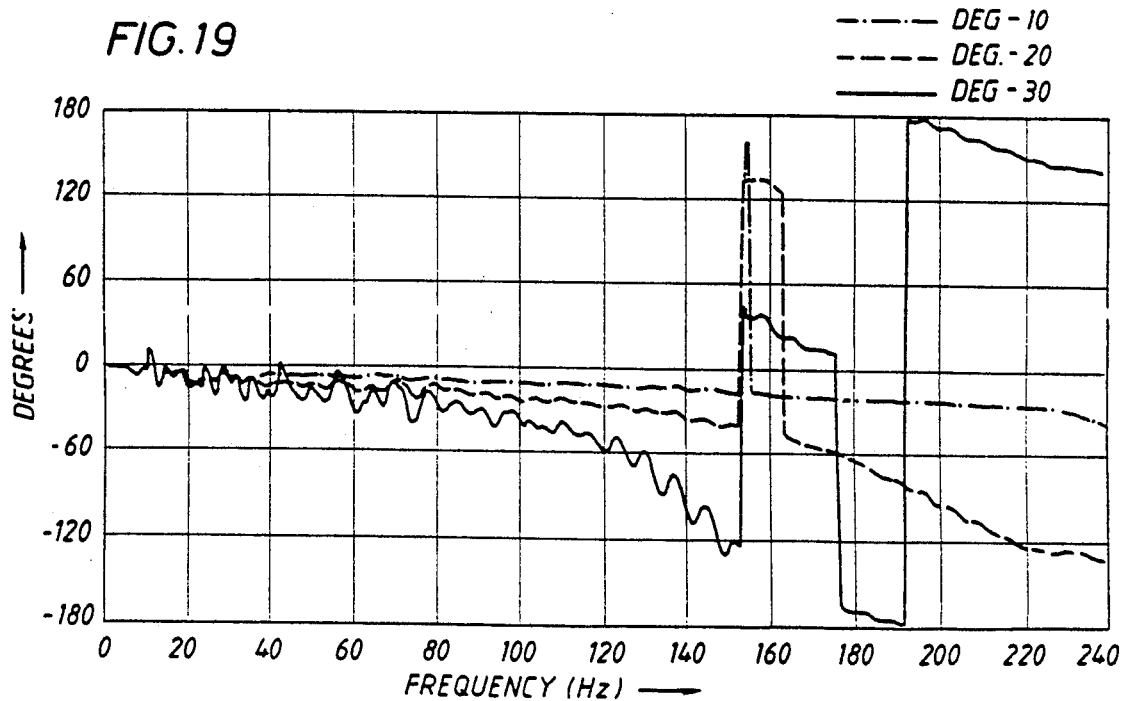

CONTROLLED PHASE MARINE SOURCE SUBARRAY

RELATED APPLICATION

This application is a continuation-in-part application of co-pending application Ser. No. 751,295 filed on Aug. 28, 1991, now U.S. Pat. No. 5,142,498.

BACKGROUND OF THE INVENTION

This invention relates to marine seismic data acquisition and, more particularly, relates to source arrays for use in marine seismic data acquisition for hydrocarbon exploration or production purposes.

The general purpose of marine seismic data is to provide seismic images and other information related to the character of the earth formations located below the water. According to these marine seismic data acquisition techniques, source pulses are periodically generated (by a collection of individual seismic sources that make up a towed source array) at selected locations along a marine vessel's path as the vessel moves with constant speed usually along a straight line. These source array pulses travel down through the water to the water/earth interface (water or sea bottom), where they enter the earth. As these seismic pulses penetrate the earth strata under the water, some fractional amount of the energy in these pulses is reflected or refracted, and eventually some of this energy returns upwardly in the water as pressure pulses.

The marine vessel usually also tows behind it a submerged streamer cable in a straight line (often called the seismic line) being traversed by the vessel and these upwardly travelling pressure pulses may be detected by seismic detectors located in the streamer cable. Typically, these sensitive detector instruments convert the pressure pulses into electrical signals which may be routed to the vessel and recorded for further processing to derive information that may be presented as a seismic image or map of the submarine earthen area under investigation. These images or maps may then indicate the presence of any appropriate geological formations capable of holding hydrocarbons like oil and/or gas.

The source array is usually made up of a plurality of subarrays with each subarray often consisting of several individual and nonidentical seismic sources. The elements within a subarray are usually towed one behind another along a line that is near to and parallel with the seismic line, often with the larger seismic sources nearer the vessel. Typically the same marine vessel will also tow the streamer cable which contains the seismic detectors, although different vessels may be used to tow different portions of this hardware.

Various types of individual marine seismic sources are available for use in such a source array, for example, water guns, marine vibrators, and air guns. Water guns and marine vibrators tend to produce pressure pulses that have broad band frequency spectra while an individual air gun tends to produce pressure pulses that have a narrow band frequency spectra. Air guns are a very popular marine seismic source and will be the basis for further discussion, although other sources, such as water guns and marine vibrators, may also be used as marine seismic sources.

An air gun is towed at some depth (from a few feet to a few tens of feet) below the surface of the water and, in general, suddenly releases a confined volume of high pressure air, thus radiating seismic energy in all directions. Typically, the near-field waveform generated by a single air gun is a long series of damped oscillatory pressure pulses resulting in a corresponding periodic frequency spectrum having a fundamental frequency and multiples thereof that are related to the depth of the gun, and the gun's operating pressure and chamber volume. In addition to this undesirable long pulse, a single air gun is a relatively weak energy source, so that any electrical signal derived from subsurface reflections or refractions will likely have a low value. These features make a single air gun undesirable for marine seismic data acquisition. To improve both the signal strength and the signal shape it has been proposed and is well known to use a plurality of air gun sources belonging to a so-called "tuned array".

It has been found advantageous in marine seismic data acquisition to use a plurality of individual air guns within such an array in order to provide a composite vertically downgoing source array pulse of satisfactory amplitude and sufficient frequency content. More particularly, it has been found desirable to simultaneously generate a number of pressure fields from air guns having various fundamental frequencies and multiples thereof to provide a composite vertically downgoing array pulse having high energy and a broad frequency spectrum. That is, air guns at the same depth and supplied by the same high pressure air source, but having various chamber volume capacities are generally used in such arrays in order to produce an energetic (high amplitude) vertically downgoing composite array pulse having a broad frequency band.

The air gun with largest chamber volume provides the lowest fundamental frequency. The other guns have fundamental frequencies that fill in between this lowest frequency and twice this lowest fundamental frequency (first harmonic). In this way the frequency spectrum or band is essentially completely filled in since these other guns have frequency spectra that also repeat at multiples of their fundamental frequencies. In general, these fundamental frequencies also depend on interactions among the pressure fields radiated by the air guns, i.e., on the array geometry. Hence, air gun array design is complicated due to the interactions among the individual elements.

Array design is simplified when array elements radiate the same waveform regardless of their location in the array. For example, marine vibrators and waterguns more accurately approximate an element (for typical spacing) whose outgoing waveform is independent of position in the array than an air gun. Air gun interaction does, however, tend to broaden the fundamental frequency and its harmonics thereby helping to fill in the array pulse's spectrum. It is important to note that each particular chamber volume is roughly responsible for a different portion of the composite pulse's frequency spectrum. Many such air gun arrays have been designed and implemented using an increasing number of guns and an increasing total volume of compressed air.

In addition, it is known to construct an array from several subarrays, with each subarray being a separate collection of air guns of different chamber volumes designed to provide a desirable vertically downgoing pulse. There may be several of these subarrays that are towed in parallel behind the vessel, i.e. a "cross-line" fashion, to provide a so-called "super wide array". Alternatively, many of these subarrays may be towed in a serial manner behind the vessel, i.e. an "in-line" fashion, to provide a so-called "super long array".

In general, such prior array designs usually attempt to solve the problem of maximizing the amplitude spectrum over a desired frequency range in order to ensure that there is a satisfactory vertically downgoing, broad frequency band, composite array pulse having desired peak-to-peak and peak-to-bubble values. Although it is known that an array pulse's amplitude and phase spectra depend upon the angle of emergence from the array, this effect is usually ignored.

Thus, the amplitude and phase spectra of a far-field generally downgoing pulse for an array can be related to the deviation from the downgoing vertical direction, as measured by the angle of emergence from the array (or emergence angle), or equivalently the angle of incidence into the earth. In the subsequent processing of the recorded seismic data it is sometimes desirable to remove any array pulse's far-field phase spectrum from the data. This far-field phase spectrum depends upon the array geometry and notional waveforms radiated by the individual sources. With this information (array geometry and notional waveforms), it is possible to correct for the changes in phase as a function of emergence or incidence angle. This is a fairly large amount of signature information and each incidence angle receives its own unique correction. This level of effort is usually not put forth. Accordingly, it is currently conventional practice to ignore any phase variation with incidence angle and to assume that the phase spectra of source array pulses radiated into incidence angles of interest are identical with that of the vertically downgoing pulse even though this assumption is not justified for typical source array designs.

These and other limitations and disadvantages of the prior art are overcome by the present invention, however, and improved methods and apparatus are provided for a marine seismic source array having controlled phase.

SUMMARY OF THE INVENTION

In a preferred embodiment of the present invention, a controlled phase marine seismic array, and methods of constructing such an array, are provided. More particularly, methods of constructing a controlled phase marine seismic array made up of a plurality of subarrays are provided by the present invention. An embodiment of a subarray is also provided in this invention. In addition, the present invention provides controlled phase marine seismic source arrays.

A controlled phase marine source array of the present invention provides phase control for source array pulses radiated into emergence (or incidence) angles of interest. Specifically, phase control means that the phase spectra associated with source array pulses radiated in a generally downgoing direction, i.e. for angles of emergence from the array that are of interest, will exactly match the phase spectrum associated with a vertically downgoing source array pulse out to the array's "ghost-notch" frequency (described below). In the frequency domain, the same degree of phase control is available as is available with a point source. However, the range of emergence angles over which phase control is possible may be limited by the array geometry. Proper attention to and control of array geometry and the radiation characteristics of the individual source elements provides a controlled phase marine array of the present invention.

A point source radiates generally downgoing far-field pulses with phase spectra that exactly match the phase spectrum of the far-field vertically downgoing pulse, up to a "ghost-notch" frequency. The ghost-notch frequency is related to the depth of operation of the point source and the vertically downgoing direction, and results from the modulation of the outgoing waveform by a "ghost" reflection off the ocean's surface. The term "far-field" is used herein to mean the radiation field at a distance sufficiently far from the source array that an array pulse's frequency spectrum is the amplitude and phase of the time harmonic spherical waves being superimposed to form the far-field pulse for the generally downgoing direction of interest. The present invention provides source arrays having far-field pulses with phase spectra that match the phase spectrum of the far-field vertically downgoing pulse for emergence (or incidence) angles of interest, up to the ghost-notch frequency; that is, the present invention provides a marine source array that duplicates the phase relationship of a point source for emergence (or incidence) angles of interest.

The description for the present invention may include identical elements, identical spacings between elements and the elements have symmetrical spacing about an array's geometric centroid. In practice, because of the physical conditions and constraints under which the present invention will have to operate, the invention may not be implemented in exact accordance with these requirements. However, the present invention will operate as described herein within a small range of parameters that are approximately the same as the requirements in this disclosure. Nevertheless, it is preferred to have the elements, spacings and symmetry conform as closely as possible to the described requirements.

When broad band elements (for example, certain types of water guns) are present in a source array, the present invention requires that the elements within a particular subarray radiate at the same or nearly the same pressure field (i.e. contain only one type or size of source element). In addition, any particular subarray within the source array of the present invention employing identical elements is required to contain the same number of elements and employ identical or nearly identical spacing between identical subarray elements. For source arrays of the present invention that include broad band sources, identical source elements are required for a given subarray and that subarray's elements have symmetrical spacing about the array's geometric centroid. However, the size or type of the individual elements employed in each of the different subarrays may be different between the subarrays. The number of subarrays, their depths, spacing between them, element spacing, and element's depths within each subarray is determined by establishing an acceptable composite array pulse while paying attention to the criteria of the present invention for phase control.

When narrow band source elements (for example, air guns within a tuned source array) are present in a source array of the present invention, an individual subarray may have approximately the same type or size of source element, or more than one type or size of source element. In accordance with the present invention, the element spacing between sources within different subarrays is not required to be identical, but identical elements (or nearly identical elements that generate approximately the same wave pulse) in different subarrays are required to have identical element-to-element spacing. Also, identical elements anywhere in the source array of the present invention should radiate the same or nearly the same outgoing waveform.

For either of these cases (broad band elements or narrow band elements), phase control in accordance with the present invention is achieved by symmetrically arranging all the identically (or nearly identically) radiating source elements about the source array's geometric centroid. The line (for 2D seismic acquisition) about which the symmetrical arrangement is made is the direction for which phase control is achieved (normally in-line along the seismic line). If all the source elements in the source array of the present invention are identical or near identical then phase control over all azimuthal directions at the same time is possible.

The methods of the present invention select the maximum emergence (or incidence) angle of interest (usually the maximum angle of emergence from the array is selected to be about 30 degrees), the maximum operating depth (based upon a ghost notch frequency), the type or types of individual source elements (based upon the desired frequency band of the array and available source elements), select (for each type of source element selected) the number of subarray elements and their spacing and depths based upon the ghost-notch frequency (or maximum depth) and maximum incidence angle (for which phase control is desired), and then construct a plurality of linear subarrays from those elements and arrange those subarrays so that their individually radiated pressure fields provide a composite array pulse of acceptable bandwidth, peak-to-peak amplitude, and peak-to-bubble ratio along some preferred direction (typically vertically downgoing); again, identical elements are arranged symmetrically about the array's geometric centroid and radiate the same or nearly the same outgoing waveform.

In accordance with the present invention, each subarray containing identical (or nearly identical) elements employs the same number of identical elements and element-to- identical element spacing. The identical source elements within each subarray are arranged with a symmetrical spacing about the array's geometric centroid. Each identical (or nearly identical) element within the array of the present invention radiates the same or nearly the same outgoing waveform and the number of elements and spacing and depth each element in each subarray is selected so that the array factors (discussed later herein) for all the subarrays are equal and positive for incidence angles up to the maximum incidence angle of interest and for frequencies up to the ghost-notch frequency, where the incidence angles of interest are along a direction defined by a line about which the identical elements are symmetrically spaced. In this manner, the controlled phase marine seismic array of the present invention (utilizing broad band source elements) provides radiated, generally downgoing, i.e. for incidence angles of interest, far-field pulses with phase spectra that match the phase spectrum of the far-field vertically downgoing pulse of the array, for frequencies less than the ghost-notch frequency.

In accordance with the present invention, subarrays may have different elements with each element having a different element spacing and depth. Each subarray of the present invention may contain a single type and size of source element, or when different types or sizes of elements radiate at different frequencies, a mix of elements may be contained in a single subarray, but the individual types or sizes of source elements within each subarray are arranged symmetrically about the array's geometric centroid. That is, identical source elements within subarrays of the present invention are arranged with symmetrical spacing about the array's geometric centroid. Each identical element within the array of the present invention radiates the same or nearly the same outgoing waveform and the element spacing and depth in each subarray is selected so that the array factors associated with any particular type of element contained in the subarrays are equal and positive for incidence angles up to the maximum incidence angle of interest and for frequencies up to the ghost-notch frequency, where the incidence angles of interest are along a direction defined by a line about which the identical elements are symmetrically spaced.

In this manner, the methods of the present invention provide controlled phase marine seismic arrays utilizing narrow band sources that generate radiated, generally downgoing (i.e. for incidence angles of interest) far-field pulses with phase spectra that match the phase spectrum of the vertically downgoing far-field pulse of the array, for frequencies less than the ghost-notch frequency, where the incidence angles of interest are along a direction defined by a line about which the identical elements are symmetrically spaced.

The apparatus of the present invention is a controlled phase marine seismic source array made up of a plurality of linear subarrays having an identical number elements, or, subsets of identical elements within individual subarrays when individual sources are narrow band, with the numbers of and element spacing and depths for identical elements based upon the maximum incidence angle and highest frequency (i.e. a ghost-notch frequency) for which phase control is desired, arranged to operate at a preselected maximum depth and arranged to provide a desired array pulse.

It is a feature of the present invention to provide methods for constructing controlled phase marine source arrays.

It is a feature of the present invention to provide controlled phase marine seismic source arrays.

These and other features and advantages of the present invention will become apparent from the following detailed description, wherein reference is made to the Figures in the accompanying drawings.

IN THE DRAWINGS

FIG. 1 is a schematic depiction of a marine seismic exploration vessel towing a source array and a streamer cable.

FIG. 2 depicts a diagrammatic, partially cross-sectional, view of the equipment of FIG. 1 and a cross-section of the water and submarine earth.

FIG. 3 depicts a general Cartesian coordinate system and a three dimensional point source array with an observation point.

FIG. 10 depicts phase error for selected incidence angles for the array of FIG. 8.

FIG. 11 depicts design criteria for identical elements (number of elements times element spacing) for various operating depths.

FIG. 18 depicts another convention array.

FIG. 19 depicts the phase error for selected incidence angles for the array of FIG. 18, with inter-element interaction.

DETAILED DESCRIPTION

Figure 4:
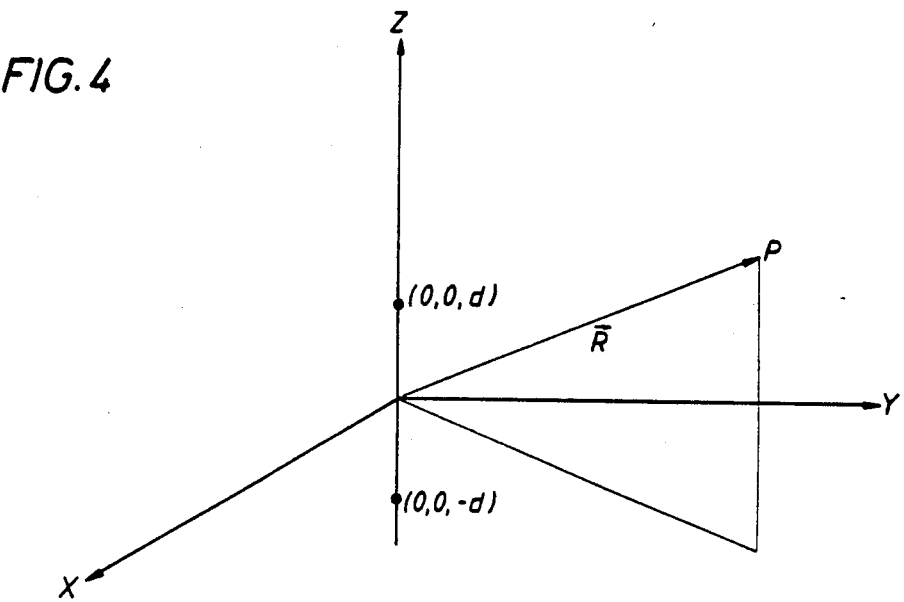
FIG. 4 depicts a single element source and its ghost image in a Cartesian coordinate system.

Referring now to FIG. 1 there may be seen a schematic depiction of a marine vessel 10 deploying a marine seismic acquisition cable 20 and a marine seismic acquisition source array 21, 22, 23, 24, 25, 26. The vessel 10 tows a marine seismic cable 20 to receive seismic signals or data from the earthen substrata beneath the body of water 14 (see FIG. 2). The cable 20 may be quite lengthy, for example, a mile or more, and is normally composed of a number of individual receiving sections 32 connected end-to-end.

The vessel 10 is depicted towing a seismic source array consisting of six subarrays 21, 22, 23, 24, 25, 26. Each subarray 21-26 is connected by means of any suitable connecting means, such as a cable 15, to the vessel 10. Each subarray 21-26 carries a number of individual seismic sources (schematically depicted as circles), such as air guns. The technical details of a seismic source array and its operations, as such, are known to those skilled in the art and will not be described any further. However, it will be appreciated that the methods of the present invention may be carried out with any type of seismic source capable of forming an array and the arrays of the present invention may employ any type of seismic source.

Referring now to FIG. 2, a diagrammatic view of the equipment depicted in FIG. 1 is shown to illustrate a conventional marine geophysical method. More particularly, the marine vessel 10 is shown deploying a marine seismic cable 20 and an appropriate marine source array 21–26. Only one source 26a of one subarray 26 is illustrated in FIG. 2 for ease of illustration purposes. As noted in FIG. 2, the source 26a seismic energy 27 which passes downwardly through the water bottom 18 into the subsurface earth where reflections 28, 30 and refractions (not shown) from various subsurface earthen boundaries occur, and ultimately some upcoming seismic energy 29, 31 is detected by the various sections 32 of the submerged seismic marine streamer cable 20. In reality, any particular downgoing pulse along an incidence angle of interest is a composite pulse that results from energizing all the individual sources in the subarrays that make up the array.

In general, such prior array designs usually attempt to solve the problem of maximizing the amplitude over a desired frequency range in order to ensure that there is a satisfactory broad band, high amplitude pulse associated with the array's composite vertically downgoing seismic pulse. Although it is known that a downgoing array pulse's amplitude and phase spectra depend upon the angle of emergence from the array, or equivalently the angle of incidence into the earth, this effect is usually ignored as most angles of incidence are considered small (i.e. less than about 30°).

Thus, an array's far-field amplitude pulse depends upon the angle of emergence from the array, or equivalently the angle of incidence into the earth. It has also been found that the phase spectrum of an array's pulse is also typically a function of the emergence (or incidence) angle. In the subsequent processing of the recorded seismic data it is sometimes desirable to remove this array phase spectrum from the data. The array's far-field amplitude pulse and its phase spectrum depend upon the array geometry and the waveforms radiated by the individual sources (notional waveforms for air gun elements). With this information (array geometry and waveforms), it is possible to correct for the changes in phase as a function of angle of emergence from an array (or incidence angle). This is a fairly large amount of signature information and each incidence angle must first be determined and its own unique correction then determined. This level of effort is usually not put forth. Accordingly, it is currently conventional practice to ignore any phase variation with incidence angle.

A controlled phase marine source array of the present invention provides phase control for source array pulses radiated into emergence (or incidence) angles of interest. Specifically, phase control means that the phase spectra associated with source array pulses radiated in a generally downgoing direction, i.e. for angles of emergence from the array that are of interest, will exactly match the phase spectrum associated with a vertically downgoing source array pulse out to the "ghost- notch"

frequency. In the frequency domain, the same degree of phase control is available as is available with a point source. However, the range of emergence angles over which phase control is possible may be limited by the array geometry. Proper attention to and control of array geometry and the radiation characteristics of the individual source elements provides a controlled phase marine array of the present invention.

A point source radiates generally downgoing far-field pulses with phase spectra that exactly match the phase spectrum of the far-field vertically downgoing pulse, up to a "ghost-notch" frequency. The ghost-notch frequency is related to the depth of operation of the point source and the vertically downgoing direction. The term "far-field" is used herein to mean the radiation field at a distance sufficiently far from the source array that an array pulse's frequency spectrum is the amplitude and phase of the time harmonic spherical waves being superimposed to form the far-field pulse for the generally downgoing direction of interest.

The present invention provides source arrays having far-field pulses with phase spectra that match the phase spectrum of the far-field vertically downgoing pulse for emergence (or incidence) angles of interest, up to the ghost- notch frequency; that is, the present invention provides a marine source array that duplicates the phase relationship of a point source for emergence (or incidence) angles of interest. This allows a single measurement of the vertically downgoing signature (i.e. pulse) of the array to subsequently be used to accurately remove the phase spectra associated with generally downgoing pulses, i.e. those radiated into incidence angles of interest, when processing data. This eliminates errors associated with this type of processing that are present when the vertically downgoing pulse is radiated from a source array that is not a controlled phase source array. It also eliminates the need to record each array element's individually radiated waveform (notional waveform for air gun elements) or the need to know any specific emergence or incidence angle.

When broad band elements (for example, certain types of water guns) are present in a source array, the present invention requires that each subarray contain only one type or size of source element and that each source element in a particular subarray radiate the same or nearly the same pressure field. In addition, any particular subarray within the source array of the present invention employing identical elements is required to contain the same number of elements and employ identical spacing between identical subarray elements.

When narrow band source elements (for example, air guns within a tuned source array) are present in a source array of the present invention, an individual subarray may have a single type or size of source element, or more than a single type or size of source element. In accordance with the present invention, the element spacing between sources within different subarrays is not required to be identical, but identical (or nearly identical) elements in different subarrays are required to have identical element-to-element spacing. Also, identical elements anywhere in the source array of the present invention should radiate the same or nearly the same outgoing waveform.

For either of these cases (broad band elements or narrow band elements), phase control in accordance with the present invention is achieved by symmetrically arranging all the identically (or nearly identically) radiating source elements about the source array's geometric centroid. The line (for 2D seismic acquisition) about which the symmetrical arrangement is made is the direction for which phase control is achieved (normally in-line along the seismic line). For 3D seismic acquisition, the geometric centroid is a point. If all the source elements in the source array of the present invention are identical then phase control over all azimuthal directions at the same time is possible.

For source arrays of the present invention that include broad band sources, identical source elements are required for a given subarray and that subarray's elements have symmetrical spacing about the array's geometric centroid. However, the size or type of the individual elements employed in each of the different subarrays may be different between the subarrays. The number of subarrays, spacing between them, and element spacing and depth within each subarray is determined by establishing an acceptable composite array pulse while paying attention to the criteria of the present invention for phase control.

During the implementation of the present invention, it was discovered that the invention can effectively operate at parameters that are slightly different from those described herein. Because of the need to build a desired pulse or the need to compensate for guns that are slightly different in size, there may be a need to vary the depths of the elements in a subarray. Results show that a slight variance in the depths between elements in a subarray do not adversely affect the performance of the invention (theoretically, the depths of the elements should be the same in order for the invention to effectively operate). In addition, because of the physical conditions underwhich the invention may be required to operate, requirements for identical elements in a subarray for identical spacing between elements and that elements have symmetrical spacing about the array's geometric centroid may be slightly altered as necessary to effectively operate the invention. However, it is preferred to have the elements, spacings and symmetry conform as closely as possible to the described requirements in this disclosure.

In accordance with the present invention, each subarray containing identical elements employs the same number of identical elements and element-to-element spacing. The identical source elements within each subarray are arranged with a symmetrical spacing about the array's geometric centroid. Each identical element within the array of the present invention radiates the same or nearly the same outgoing waveform and the number of elements and spacing in each subarray is selected so that the array factors (discussed later herein) for all the subarrays are equal and positive for incidence angles up to the maximum incidence angle of interest and for frequencies up to the ghost-notch frequency, where the incidence angles of interest are along a direction defined by a line (or point) about which the identical elements are symmetrically spaced. In this manner, the controlled phase marine seismic array of the present invention (utilizing broad band source elements) provides radiated, generally downgoing, i.e. for incidence angles of interest, far-field pulses with phase spectra that match the phase spectrum of the far-field vertically downgoing pulse of the array, for frequencies less than the ghost-notch frequency.

For conventional tuned air gun arrays the number and sizes of air guns in an individual subarray is usually required to be large enough to fill in or cover a desired frequency band or spectrum. When designing for phase control in accordance with the present invention, the array may be designed as if the elements were broad band, but is still designed to provide coverage over some desired, preselected frequency band. The number of subarrays would then be at least equal to the number of air guns required for a conventional air gun subarray. For tuned air gun arrays, or any other type of array where different radiating or source elements contribute to different parts of the frequency spectrum, the present invention may employ a "mix" of different size sources within the same subarray. For example, two air guns having different volumes may physically fall on the same straight line, i.e. in the same subarray (or in two overlaid subarrays), and each size may still have a symmetrical spacing relative to the array's geometric centroid. Since these two guns are radiating outgoing waveforms having different and nonoverlapping frequency spectra, they may be treated independently, with each gun size's array factor controlling how the amplitude of the array pulse behaves at its fundamental frequency (and multiples of the fundamental frequency) as the incidence angle increases. Even if the two guns radiate interacting waveforms so that their respective frequency spectra overlap to the extent that they provide a "smooth" resulting amplitude spectra, they may still be treated as approximately independent. Such source mixing is presently preferred as it will allow the total number of subarrays to be decreased.

In accordance with present invention, subarrays may have different elements with each element having a different element spacing. Each subarray of the present invention may contain a single type and size of source element, or when different types or sizes of elements radiate at different frequencies, a mix of elements may be contained in a single subarray, but the individual types or sizes of source elements within each subarray are arranged symmetrically about the array's geometric centroid. That is, identical source elements within subarrays of the present invention are arranged with symmetrical spacing about the array's geometric centroid. Each identical element within the array of the present invention radiates the same or nearly the same outgoing waveform and the number of elements and spacing in each subarray is selected so that the array factors associated with any particular element contained in the subarrays are equal and positive for incidence angles up to the maximum incidence angle of interest and for frequencies up to the ghost-notch frequency, where the incidence angles of interest are along a direction defined by a line (or point) about which the identical elements are symmetrically spaced.

The methods of the present invention allow for the construction of a marine seismic source array having phase control. This means that the phase spectrum of the far-field vertically downgoing source pulse of the array of the present invention will exactly match the phase spectra of far-field source pulses for incidence angles of interest, out to the ghost-notch frequency. As far as phase is concerned, the array of the present invention will behave as if it were effectively a point source for incidence angles and frequencies of interest. In general, both linear arrays and areal arrays may be designed for such phase control using the methods of the present invention. Brief discussions of a point source and a linear array are provided to give a better understanding of the methods of making and the arrays of the present invention.

A point source offers azimuthal symmetry and phase control over all emergence angles (or incidence angles) and a large frequency range (up to the ghost-notch frequency). Generally speaking, a point source's outgoing waveform is modulated by a so-called "ghost" reflection off the ocean surface. The phase and amplitude spectra of a point source are both affected by this "ghost" reflection. (See FIGS. 5 and 6, which are discussed later herein.) For the vertically downgoing direction, frequencies out to the ghost-notch frequency, $f_g$ ($f_g = V/2d$, where d = depth, and V = seismic velocity in water) experience a 90° phase shift, and their amplitudes are modulated by a sine function whose argument depends on the depth, frequency, incidence angle, and seismic velocity of the water. The sine function is zero at the ghost-notch frequency and changes sign for larger frequencies. This sign change creates a 180° rotation in the phase spectrum which means that the ocean surface provides a −90° phase shift to the phase spectrum of a point source at and above the ghost-notch frequency until the sine function again makes a zero crossing. This phase shift can lead to a phase error which is defined and used herein as the difference between the phase spectrum of the far-field pulses radiated into an emergence (or incidence) angle of interest and the far-field vertically downgoing pulse's phase spectrum. Because the ghost-notch frequency decreases with depth, a deeper element has a smaller frequency range over which phase control may be effectively and easily maintained.

A single linear array consists of point sources possibly having different depths that are arranged in a straight line. Generally, the straight line would fall along the "in-line" direction (parallel to the streamer cable or vessel path) or the "cross-line" direction (perpendicular to the streamer cable or vessel path). A linear array destroys the azimuthal symmetry available from a point source. However, an in-line or cross-line linear array offers the same degree of phase control as a point source for the cross-line or in-line direction, respectively. Thus, one aspect of the present invention is to provide in-line phase control or cross-line phase control via a cross-line or in-line linear array, respectively. However, the number and spacing of elements for an in-line or cross-line linear array must be properly selected for phase control in the in-line or cross-line direction, respectively.

Although a point source array and a single linear array may be used for marine seismic data acquisition, two dimensional arrays or areal arrays (i.e., as depicted in FIG. 1) are normally used for such data acquisition. According to the methods of the present invention, phase control may be accomplished for such areal arrays.

The methods of the present invention control the phase spectrum for in-line applications by using in-line subarrays each of whose elements have a symmetrical spacing about the array's geometric centroid and, within a particular subarray, radiate the same or nearly the same waveform. The term "geometric centroid" of an array is used herein to mean the average value of the coordinates of the elements that make up the array; for example, when all the elements are all at the same depth, the average of the X and Y coordinates of the elements in the array is the geometric centroid. Radiating the same (or nearly the same) waveform may require that the distance between elements be selected so that there is little interaction between the elements of a particular subarray (or the array). When each in-line subarray has the same geometry with symmetrical spacing along the in-line direction relative to the array's geometric centroid, then each subarray's array factor will be identical, and the phase spectra of in-line far-field pulses will be the same as that for the vertically downgoing far-field pulse for incidence angles of interest and frequencies up to the ghost-notch frequency. (Array factors are discussed later herein.) The number of elements and element spacing are selected so that any 180° phase error is caused by depth (ghost-notch) and not the array factor of an individual subarray.

In this manner, a controlled phase marine seismic array radiates far-field pulses into incidence angles of interest with a phase spectra that match the phase spectrum of the far-field vertically downgoing pulse. When the array is comprised of only narrow band elements (where a particular type of element is responsible for only a certain portion of the overall array frequency bandwidth), then different types of elements may be mixed within the subarrays, and the subarrays do not all have to have the same configuration. However, each type of element has to be symmetrically spaced within each subarray, and a particular type of element has to have identical spacing (relative to the array's geometric centroid) within all the subarrays where it is used.

Any particular element's array factor will be identical for any subarray within the array, and the phase spectra of in-line far-field pulses (for the narrow band of frequencies associated with the particular element) will be the same as that for the vertically downgoing far-field pulse for incidence angles and frequencies of interest, up to the ghost-notch frequency. The element's array factor will be selected so that any 180° phase error is caused by the depth (ghost-notch) and not the array factor for that type or size of element. In this manner, a controlled phase marine seismic array (comprised of narrow band elements like air guns) radiates far-field pulses into incidence angles of interest with phase spectra that match the phase spectrum of the far-field vertically downgoing pulse.

In general, according to the methods of the present invention, phase control may be achieved most easily by using identical elements within an individual in-line subarray (with the number of elements and element spacing based upon the incidence angle of interest and depth) and then duplicating this subarray as the other in-line subarrays to create the overall array. The elements used in a subarray may vary from subarray to subarray, but identical elements must be symmetrically disposed about the array's geometric centroid. For narrow band elements, such as air guns, an individual subarray may also contain different size elements. The phase spectrum in a cross-line direction may be controlled by preferably requiring that the elements in each cross-line subarray radiate the same (or nearly the same) waveform and that the cross-line array factors for each subarray all be identical (or nearly identical). In a similar manner, cross-line phase control is also possible for narrow band elements.

The far-field phase spectrum may be calculated for any direction using array geometry and the outgoing waveforms from the individual elements of that array. ("A Theory for Marine Source Arrays," by Richard E. Duren, *Geophysics*, Vol. 53, No. 5, pp. 650-658 [May 1988].) In general, array geometry is routinely recorded, but suitable measurements of the outgoing waveforms from the individual elements or from the overall array are not routinely made. ("Why Don't We Measure Seismic Signatures?" by A. Ziokowski, *Geophysics*, Vol. 56, No. 2, pp. 190-201 [Feb. 1991].) However, it is sometimes customary to record (via a so-called "deep tow" hydrophone) the vertically downgoing pulse from an array. Thus, by establishing an array that has a constant phase over the frequencies and incidence angles of interest, the vertically downgoing far-field phase spectrum may be determined (measured via a deep tow) and used as the phase spectrum for all incidence angles of interest. It is well known that the phase spectrum of the measuring equipment must be removed from any measured vertically downgoing pulse to establish the pulse's phase spectrum.

Referring now to FIG. 3 there may be seen a Cartesian coordinate system positioned at the water surface along with a three dimensional array of radiating point source elements located below the water surface and an observation point (P), also below the water surface. More particularly, the X axis is oriented along the in-line direction, the Y axis along the cross-line direction, and the Z axis is directed into the ocean. Thus, the "view" of FIG. 3 is from the water surface (which the X and Y axes define) along the Z axis towards the water bottom. Element position vector $\vec{p}_n$ specifies the location of the nth point source element of the array.

$$\vec{p}_n = x_n \hat{i} + y_n \hat{j} + z_n \hat{k} \tag{1}$$

where $x_n$, $y_n$, and $z_n$ are the Cartesian coordinates and $\hat{i}$, $\hat{j}$, and $\hat{k}$ are unit vectors along the corresponding axis. $\hat{R}$ is a unit vector along $\vec{R}$, the position vector to the observation point P shown on FIG. 3. $\hat{R}$ may be written in the following form:

$$\hat{R} = \sin\theta\cos\phi \hat{i} + \sin\theta\sin\phi \hat{j} + \cos\theta \hat{k} \tag{2}$$

$\hat{R}$ has unit magnitude, and its direction is uniquely specified by the spherical coordinates $\theta$ and $\phi$, which are the polar and azimuthal angles, respectively. It should also be noted that the angle $\theta$ is also sometimes referred to as the angle of emergence (or incidence).

For an infinite homogeneous medium, without ghost reflections, the array pulse $P(\vec{R},t)$ is the linear superposition of individually radiated waveforms, $$P(\vec{R},t) = \sum_{n=1}^{N} \int_{-\infty}^{+\infty} A_n(f) e^{j[2\pi f t - k r_n]} r_n^{-1} df \tag{3}$$

where N is the total number of array elements, $A_n(f)$ is the frequency spectrum of the waveform radiated by the $n^{th}$ element, f is frequency, and k is wave number. For the far-field case, i.e., when the absolute value of $\vec{p}_n$ divided by $\vec{R}$ is much, much less than one and when additional far-field assumptions may be made, i.e., $r_n$ is approximately equal, to $R - \hat{R} \cdot \vec{p}_n$ (for all n) and the dot product term may be safely ignored insofar as the spreading is concerned, then the array pulse may be rewritten as, $$P_f(\vec{R},t) = \int_{-\infty}^{+\infty} \sum_{n=1}^{N} A_n(f) e^{j[2\pi f t - kR + k\hat{R} \cdot \vec{p}_n]} R^{-1} df \tag{3}$$

This equation may be further rewritten as $$\vec{P}_F(R,t) = \int_{-\infty}^{+\infty} A(\theta,\phi,f)e^{j[2\pi ft - kR]}R^{-1}df, \quad (4)$$

where, $$A(\theta,\phi,f) = \sum_{n=1}^{N} A_n(f)e^{jk\hat{R}\cdot\vec{p}_n} \quad (5)$$

is the frequency spectrum of the far-field pulse radiated into the $\theta$ and $\phi$ direction. (See the earlier cited Duren paper.) Thus, it may be seen that the far-field array pulse is a superposition of time harmonic spherical waves. The amplitude and phase of these spherical waves define the frequency spectrum of the far-field pulse and both will change with angular direction ($\theta$, $\phi$).

It is known, however, that there are "ghost" reflections at the ocean surface of the impulses of energy from marine seismic sources. These ghost reflections may be taken into account by the use of "image" elements. These image elements double the number of elements from N to 2N, with an element's image being positioned above that element by twice the element's depth in the ocean. FIG. 4 depicts a single element and its image element. The frequency spectrum of the image element is a negative of the element's frequency spectrum when the reflection coefficient is an idealized minus 1 off the ocean surface. If the origin shown in FIGS. 3 and 4 resides on a horizontal ocean surface, and the Z axis is normal to the surface and directed into the ocean, the image positions and frequency spectra may be described as follows, $$\vec{p}_n = \vec{p}_{n-N} - 2Z_{n-N}\hat{k}, \text{ when } 2N \geq n > N; \quad (6)$$

and $$A_n(f) = A_{n-N}(f)e^{-j\pi}; \text{ when } 2N \geq n > N \quad (7)$$

From linear superposition and equation 5 the radiated far-field frequency spectrum now becomes $$A(\theta,\phi,f) = \sum_{n=1}^{2N} A_n(f)e^{jk\hat{R}\cdot\vec{p}_n} \quad (8)$$

By using equations 6 and 7 in equation 8, substituting for k, manipulating, and expanding a resulting exponential, the following result, which involves a summation only over real elements, may be found, $$A(\theta,\phi,f) = \sum_{n=1}^{N} 2j\sin(2\pi f z_n \cos\theta/V)A_n(f)e^{j2\pi f\hat{R}\cdot(\vec{p}_n - z_n\hat{k})/V} \quad (9)$$

To determine the far-field pulse's phase spectrum, $\Phi(f)$, a determination of the real and imaginary parts of the frequency spectrum must be made. The phase spectrum is then the arc tangent of the ratio of these imaginary and real functions. If the source elements all have the same depth d, equation (9) can be further simplified into the following equation, $$A(\theta,\phi,f) = 2j\sin(2\pi f d\cos\theta/V) \sum_{n=1}^{N} A_n(f)e^{j2\pi f(x_n\sin\theta\cos\phi + y_n\sin\theta\sin\phi)/V} \quad (10)$$

Equation 2 has also been used to arrive at this result. The depth, d, determines the ghost notch frequency. In practice, the source elements cannot be perfectly controlled to this depth; however, they can be controlled to approximately the same depth. Further, it may be that the variations in $Z_n$ within a subarray might be desirable within the subarray have a depth $Z_n \simeq d$. From equation (10), note that $\Phi(f)$ will, in general, depend upon the array geometry, the individual frequency spectra, and the direction of interest.

As noted before, a point source offers phase control over a large frequency range out to the ghost-notch frequency with phase control being symmetrical around the point source. However, because of the ghost-notch effect, the deeper the element, the smaller the frequency range which may be controlled. The vertically downgoing pulse far-field frequency spectrum $A(0,\phi,f,)$ for a point source may be found from equation (10)

$$A(0,\phi,f) = 2j\sin(2\pi fd/V)A(f) \quad (11)$$

where $x_1 = y_1 = 0$ and A(f) is the frequency spectrum radiated by the point source element. This radiated frequency spectrum is modulated by the ghost reflection off the ocean's surface with the phase and amplitude spectra both being affected. The phase spectrum receives a 90° phase shift (from the factor "j" before the sine function), and the amplitude spectrum is modulated by a sine function whose argument depends on the depth, frequency, and seismic velocity. The sine function changes sign as the frequency varies, creating 180° phase rotations in the phase spectrum.

For an arbitrary incidence angle, $\theta$, a point source's far-field frequency spectrum may be found from equation 10 as follows:

$$A(\theta,\phi,f) = 2j\sin(2\pi fd\cos\theta/V)A(f) \quad (2)$$

Again, the image element contributes a 90° phase shift as well as an additional multiplicative factor of 2 sin ($2\theta fd\cos\theta/V$). From equations 11 and 12 the pulse phase spectrum at an emergence angle $\theta$ will be identical with the vertically downgoing phase spectrum as long as $$sign[\sin(2\pi fd\cos\theta/V)/\sin(2\pi fd/V)] = +1 \quad (13)$$

This condition is guaranteed as long as the frequencies of interest and the depth satisfy the following relation, $$fd < 2500. \quad (14)$$

As the frequency increases, sin ($2\pi$ fd/v) will change sign before sin ($2\pi$ fdcos$\theta$/V). This will create a phase error between the vertically downgoing pulse's phase spectrum and the phase spectrum of the pulse radiated into incidence angle $\theta$. As the frequency continues to increase sin ($2\pi$ fdcos$\theta$/V) will eventually change sign which brings the phase spectra back into agreement.

Equation 13 may be satisfied for seismic frequencies of interest when care is taken to ensure that the ghost reflection does not significantly impact the phase of the high frequencies. Table 1 shows the ghost-notch frequency where sin ($2\pi$ fd/v) changes sign for various operating depths, i.e., the ghost-notch frequencies for selected operating depths.

TABLE 1

| Depth (Feet) | Ghost-Notch Frequency (Hz) |
|---|---|
| 5 | 500 |
| 10 | 250 |
| 15 | 166.7 |
| 20 | 125 |
| 25 | 100 |
| 30 | 83.33 |
| 35 | 71.43 |
| 40 | 62.50 |
| 45 | 55.56 |
| 50 | 50 |

Figure 5:
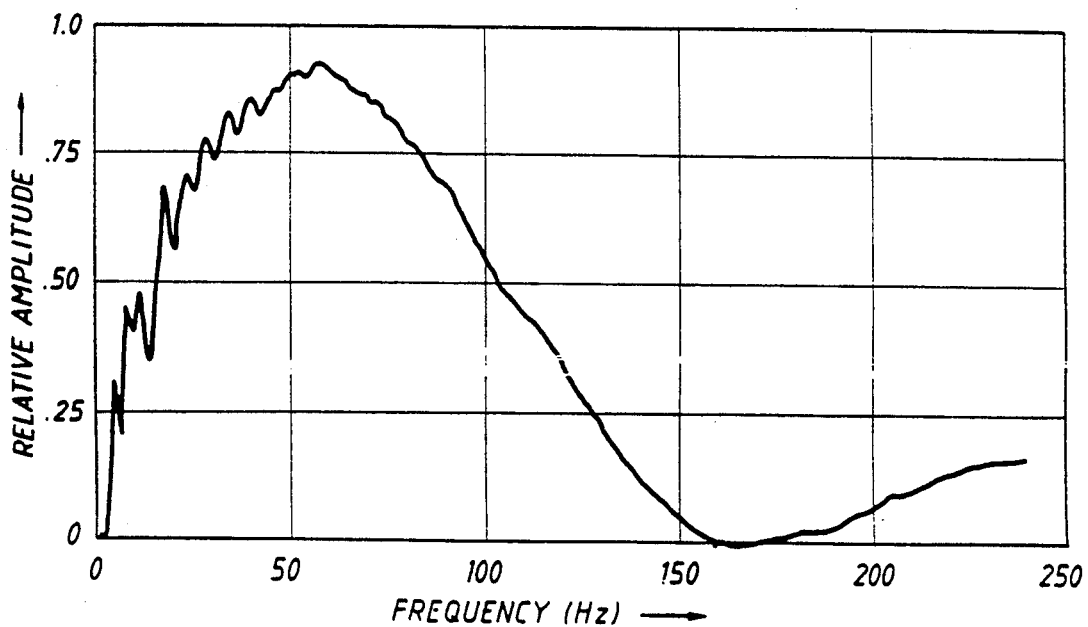
FIG. 5 depicts the far-field vertically downgoing amplitude spectra for a point source.
Figure 6:
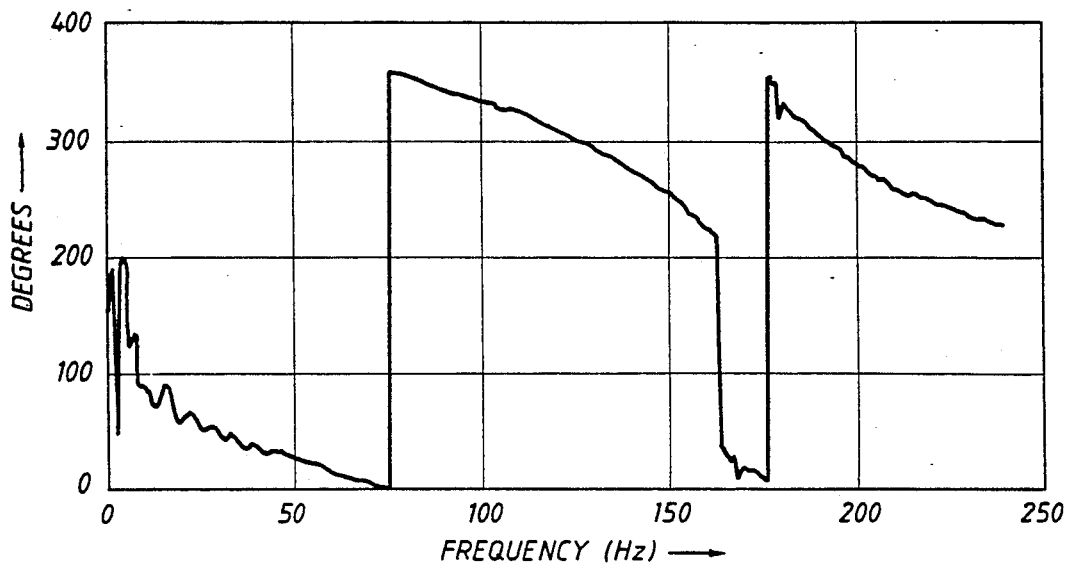
FIG. 6 depicts the far-field vertically downgoing phase spectra for a point source.
Figure 7:
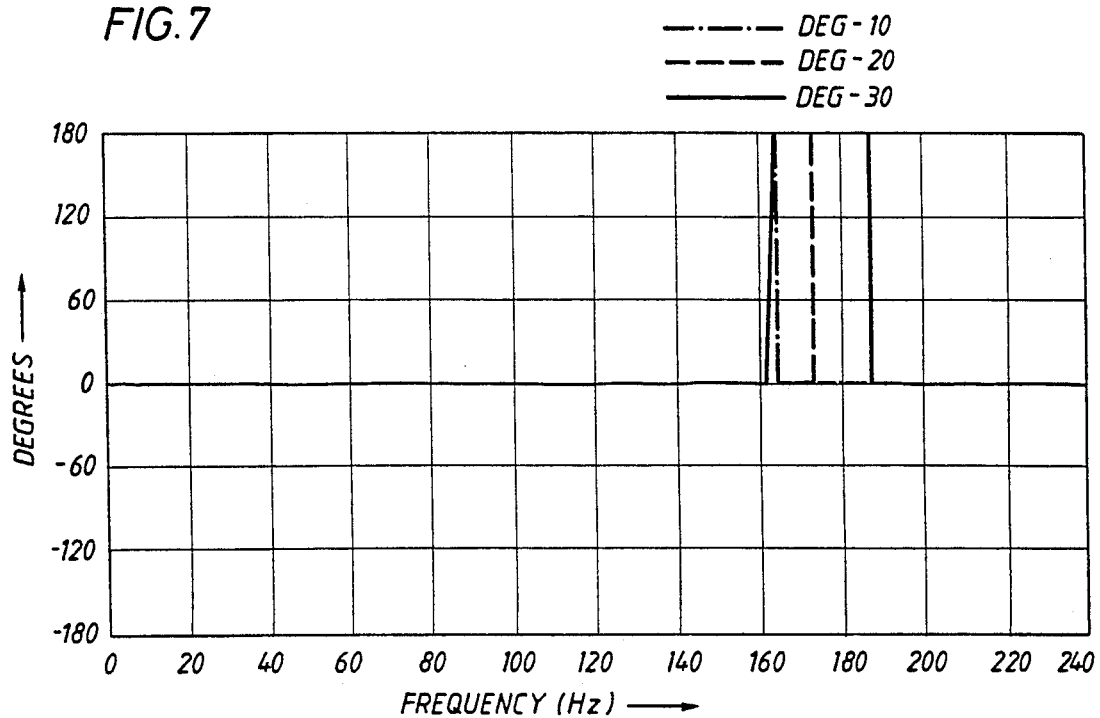
FIG. 7 depicts phase error for selected incidence angles for a point source.

For a point source, phase control is automatically available out to the ghost-notch frequency. FIGS. 5 and 6 depict a computer generated vertically downgoing far-field amplitude and phase spectra for a broad band point source. The amplitude spectra becomes zero at the "ghost-notch frequency" of 164 Hz, which corresponds to a depth of 4.669 meters, and the phase spectrum also flips 180° at this frequency. FIG. 7 shows computer generated phase errors for incidence angles of 10°, 20° and 30°. Each phase error curve is the phase spectrum at the incidence angle of interest minus the phase spectrum for a pulse at $\theta=0°$, i.e., vertically downgoing. FIG. 7 shows that the phase spectra are identical with the downgoing phase spectra for frequencies out to 164 Hz. A 180° phase error occurs at 164 Hz (the ghost-notch frequency) for all incidence angles. This is because the phase spectrum of the vertically downgoing pulse has shifted by 180°, and higher frequencies must be used before the phase spectra at the incidence angles flip their phase spectra to match the downgoing phase spectrum. These phase spectra match the vertically downgoing pulse's phase spectrum when the frequency equals 166, 174 and 189 Hz for 10°, 20° and 30°, respectively.

A linear array consists of some number of point sources that are arranged in a straight line. This destroys the perfect azimuthal symmetry available with a point source. A linear cross-line array whose axis is oriented perpendicular to a seismic line has the following far-field frequency spectrum for the in-line directions, $$A(\theta,0,f) = 2j\sin(2\pi fd\cos\theta/V) \sum_{n=1}^{N} A_n(f) \quad (15)$$

The phase spectrum at incidence angle $\theta$ will match the vertically downgoing ($\theta=0$) pulse's phase spectrum except for 180° phase errors associated with depth, as previously noted for a point source. Note that the $A_n(f)$ do not have to be identical to control the in-line phase spectra associated with in-line pulses. Similarly, a linear in-line array can control cross-line phase spectra associated with cross-line pulses. Cross-line phase control may be important for acquisition techniques like a circle shoot, when the streamer cable is towed in a curved path around a target area.

According to the methods of the present invention, it is possible to configure an areal array of typical elements in a manner so that the phase spectrum of the in-line array pulses will match the vertically downgoing pulse's phase spectrum as well as if the total array were a single element (for incidence angles and frequencies of interest). A convenient coordinate frame is assumed with its origin located on the ocean surface at the geometric center of the array with the in-line direction falling along the X axis, the cross-line direction corresponding to the Y axis, and the Z axis being directed into the ocean. The array will have M in-line strings (or subarrays) with the mth string having $K_m$ elements. The methods of the present invention may control the in-line phase spectra by requiring: (1) identical values for $K_m$ (same number of elements in all subarrays) and symmetrical spacing along the X direction for each in-line subarray, and (2) the elements in a particular in-line subarray radiating the same or nearly the same outgoing waveform (which may be unique to that in-line subarray). Alternatively, this array may also be viewed as having K cross-line subarrays with each subarray having M elements. In an analogous manner, the phase spectrum may be controlled for cross-line directions by preferably requiring: (1) identical symmetrical spacing for each cross-line subarray, and (2) the elements in a particular cross-line subarray radiating the same or nearly the same outgoing waveform (which may be unique to that cross-line subarray).

However, when the array employs narrow band elements with each type of element providing a certain portion of the total frequency bandwidth, the requirement for the same number and type of elements in each subarray may be relaxed and still achieve phase control in accordance with the teachings of the present invention. For either the cross-line or in-line case, different types of elements can be mixed in a subarray. For the in-line case, this means that each $K_m$ may be decomposed into two or more different types of elements with each different type of element forming a separate subarray within an in-line string. In this case the methods of the present invention may control the in-line phase spectrum by requiring: (1) identical numbers of any particular type of element in a subarray and symmetrical spacing along the X direction for any particular type of element for any in-line subarray within the array, and (2) a particular element should radiate the same or nearly the same outgoing waveform regardless of its location in the array. This ensures a common array factor for each individual type of element. In an analogous manner, the phase spectra may be controlled for cross-line directions by requiring: (1) identical symmetrical spacing for each type of element in the cross-line direction, and (2) a particular element should radiate the same or nearly the same outgoing waveform regardless of its location in the array. Cross-line phase control may be important for acquisition techniques like a circle shoot.

For the case when the full array is a single in-line subarray, all the Y coordinates may be set to zero and the far-field pulse spectrum for in-line incidence angles is given by $$A(\theta,0,f) = 2j\sin(2\pi fd\cos\theta/V) \sum_{n=1}^{N} A_n(f)e^{j2\pi fx_n\sin\theta/V} \quad (16)$$

(see Equation 10). The phase spectra for this subarray in the cross-line direction, $\phi=90°$, will match the downgoing ($\theta=0$) pulse's phase spectrum except for 180° phase errors associated with depth. Hence, an in-line or cross-line subarray offers the same degree of phase control as a point source for the cross-line or in-line directions, respectively, according to the teachings of the present invention. With an in-line linear subarray and arbitrary outgoing wave-forms there does not appear to be any easy way to control the phase spectrum for in-line directions, $\phi=0$. To simplify this situation, assume that each element in the subarray has the same outgoing frequency spectrum, A(f). Equation 16 may now be rewritten as $$A(\theta,0,f) = 2j\sin(2\pi f d\cos\theta/V)A(f) \sum_{n=1}^{N} e^{j2\pi f x_n \sin\theta/V} \quad (17)$$

The remaining summation in equation 17 is typically called the "array factor" $AF(\theta,0, f)$, $$AF(\theta,0,f) = \sum_{n=1}^{N} e^{j2\pi f x_n \sin\theta/V} \quad (18)$$

For the vertically downgoing direction $AF(\theta,0,f)=N$ (where N is the number of elements in the array), since when $\sin\theta$ is zero ($\theta=0$), each of the exponentials is equal to one. If the element coordinates $x_n$ are chosen symmetrically about the linear subarray's midpoint, then the array factor provides a real number and the phase spectrum for any particular incidence angle will match the vertically downgoing pulse's phase spectrum when, $$sign[AF(\theta,0,f)\sin(2\pi\cos\theta/V)/\sin(2\pi f d/V)] = +1 \quad (19)$$

Even though the array factor is real, it may still change sign and cause a 180° phase error. The number of elements and their spacing should be selected to prevent this occurrence of a sign change for the frequencies and emergence angles of interest. One aspect of the invention is to select the number of elements and their spacing so that Equation 18 is a positive, real number for the incidence angles of interest and for frequencies up to the ghost-notch frequency.

If the N elements have a uniform element spacing $\Delta$ which is equal to $x_{n+1} - x_n$ along the X direction, equation 18 can be simplified into the following form:

$$AF(\theta,0,f) = \frac{\sin(N\pi f\Delta\sin\theta/V)}{\sin(\pi f\Delta\sin\theta/V)} \quad (20)$$

The following table was calculated using equation (20) in order to examine the array factor for an incidence angle of 30° (the largest expected incidence angle of interest) and an element spacing of 5 meters (a typical inter-element spacing).

TABLE 2

| Number of Elements | 180° Phase Flip From Array Factor Frequency (Hz) |
| --- | --- |
| 2 | 305 |
| 3 | 204 |
| 4 | 153 |
| 5 | 121 |
| 6 | 101 |
| 7 | 87 |
| 8 | 76 |
| 9 | 67 |
| 10 | 59 |

N the number of elements, ranges from 2-10, and the 180° phase flip frequency is where the array factor changes its sign. In general, the array factor subjects higher frequencies to polarity reversals as the number of elements is increased. Further, for a fixed element-to-element spacing, as illustrated in Table 2, as the number of elements increases the overall length of the array increases and the frequency at which the array factor changes sign (and causes a phase flip) decreases.

Figure 8:
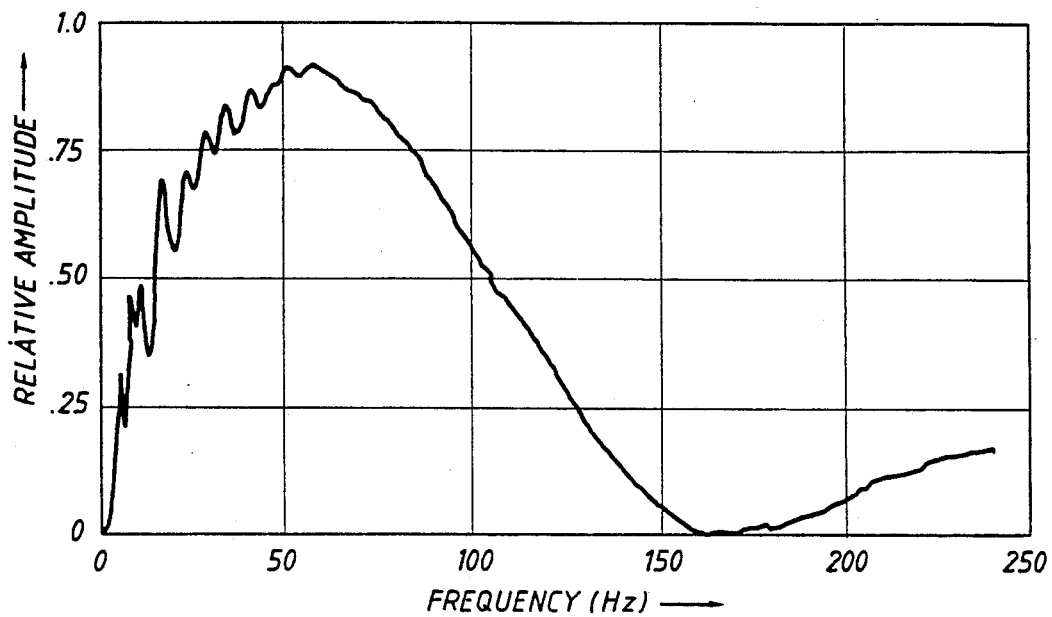
FIG. 8 depicts the far-field vertically downgoing amplitude spectra for a selected five element linear array, with no inter-element interaction.
Figure 9:
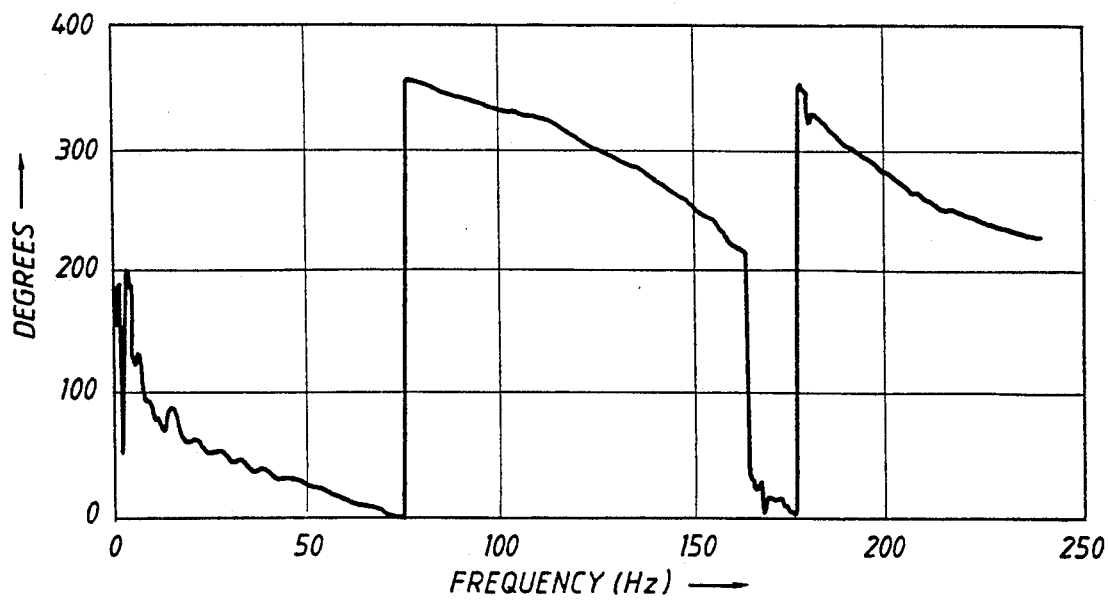
FIG. 9 depicts the far-field vertically downgoing phase spectra for the array of FIG. 8.

For a particular in-line linear subarray having five elements, i.e. N=5, when $\phi=0$, the amplitude and phase spectra are depicted in FIGS. 8 and 9. The array depth is 4.669 m (approximately 15 feet) and there is no interaction among the elements. The ghost-notch frequency (from Table 1) is about 164 Hz for this depth. FIG. 10 shows the phase error for incidence angles of 10°, 20° and 30°. In FIG. 10, note that the phase flips at 121 Hz for the 30° incidence angle. This flip is due to the array factor for N=5 as shown in Table 2. Thus, this five element subarray with 5 meter element spacing is too long for phase control for this depth of the elements, i.e., its array factor causes a phase flip before the ghost-notch frequency determined by the operating depth. Note that the phase error curve flips back into phase with the vertically downgoing pulse when the frequency is at 164 Hz. This flip back into phase is due to the array's depth. However, when the frequency is increased further to 188 Hz, the phase error is again 180° due to the array's depth. Table 2 demonstrates that at a 5 meter spacing, only up to about three elements may be used and phase still controlled. The 10° and 20° incidence angles allow for phase control out to the ghost notch frequency. However, note that the 20° error curve shows an additional phase error beyond the ghost notch. This is again due to the array factor phase flip.

The above discussion and results for a single subarray have assumed identical elements within the subarray. If the subarray were composed of different narrow band elements that radiated at different, nonoverlapping frequencies (a mixed subarray) then the above approach must be applied independently for each of the different types of element within the subarray. Even if the frequencies of the different elements partially overlap, each element may be independently evaluated using the above approach. Hence, for a particular subarray there would be an array factor for each type of element employed in that subarray.

Again, the frequency spectrum for pulses radiated in an in-line direction is (from equation 10), $$A(\theta,0,f) = 2j\sin(2\pi f d\cos\theta/V) \sum_{n=1}^{N} A_n(f)e^{j2\pi f x_n \sin\theta/V} \quad (21)$$

where $\phi=0$. Equation 21 may be used to develop the criterion for configuration of an array for phase control. By requiring that the elements within any particular in-line subarray radiate the same outgoing waveform and with that outgoing waveform being equal to $\Lambda_m(f)$, equation 21 becomes, $$A(\theta,0,f) = 2j\sin(2\pi f d\cos\theta/V)\left[\Lambda_1(f) \sum_{n=1}^{K} e^{j2\pi f x_n \sin\theta/V} + \Lambda_2(f) \sum_{n=1+K}^{2K} e^{j2\pi f x_n \sin\theta/V} + \ldots + \Lambda_M(f) \sum_{n=1+K(M-1)}^{N} e^{j2\pi f x_n \sin\theta/V}\right] \quad (22)$$

where K is the number of elements in each individual subarray (which is the same for all subarrays), M is the total number of subarrays, and N=KM. Each summation in equation 22 may be thought of as an array factor for each subarray. The phase spectrum may be matched to the vertically downgoing phase spectrum if the spacing in each subarray is identical so that the array factor for each subarray is real and positive. Then, $$A(\theta,0,f) = 2j\sin(2\pi f d\cos\theta/V) \sum_{m=1}^{M} A_m(f) \sum_{k=1}^{K} e^{j2\pi f x_k \sin\theta/V} \quad (23)$$

This equation may be further written as, $$A(\theta,0,f) = 2j\sin(2\pi f d\cos\theta/V) AF(\theta,0,f) \sum_{m=1}^{M} A_m(f), \quad (24)$$

where $AF(\theta,0,f)$ is the same array factor for each in-line subarray. If the x coordinates within each in-line subarray are chosen symmetrically about the array's geometric centroid, then the array factor for each subarray is real and, except for possible polarity flips due to the array factor changing sign, the phase spectrum will match the vertically downgoing phase spectrum as well as if the array were a point source. Polarity flips from the array factors of the subarrays may be avoided by selecting the number and positions of the elements to keep equation 18 positive. If a uniform spacing $\Delta$ is chosen in each subarray, then the array factor again becomes, $$AF(\theta,0,f) = \sin(K\pi f\Delta\sin\theta/V)/\sin(\pi f\Delta\sin\theta/V) \quad (25)$$

and this equation must remain positive.

This equation may also be used to establish designs that ensure that the array factor will not cause a phase shift before the phase shift associated with the ghost-notch. This is accomplished by taking the argument of the number in the first sine function, substituting the ghost frequency for the frequency f, setting this argument equal to $\pi$ and solving for spacing and number of elements versus depth, to provide, $$K\Delta = \frac{2d}{\sin\theta} \quad (26)$$

where K=a maximum number of elements in a subarray; $\Delta$=a maximum element spacing, d=depth, and $\theta$=incidence angle. K may be established using this equation once the spacing between the elements is established, or vice versa. Once the number of elements are selected then a maximum spacing between those elements may be determined. However, this maximum element spacing may be decreased, if necessary, (preferably for narrow band elements) to provide an appropriate array pulse. That is, the product of number of elements and element spacing is equal to or less than the right-hand side of equation (26).

FIG. 11, depicts curves calculated using equation (26) for various depths, angles of incidence and values of number of elements times element spacing. For each depth there is some maximum value allowed for the product of element number and element spacing. This maximum is plotted along the vertical axis as a function of the incidence angle. A subarray employing identical elements whose product of element spacing and number is on or below the appropriate depth curve shown in FIG. 11 controls phase in accordance with the teachings of the present invention. Alternatively, equation 26 may be employed to calculate this product once a depth and incidence angle are known or selected. Then selecting a spacing or number of elements determines the number of elements or spacing, respectively.

Figure 12:
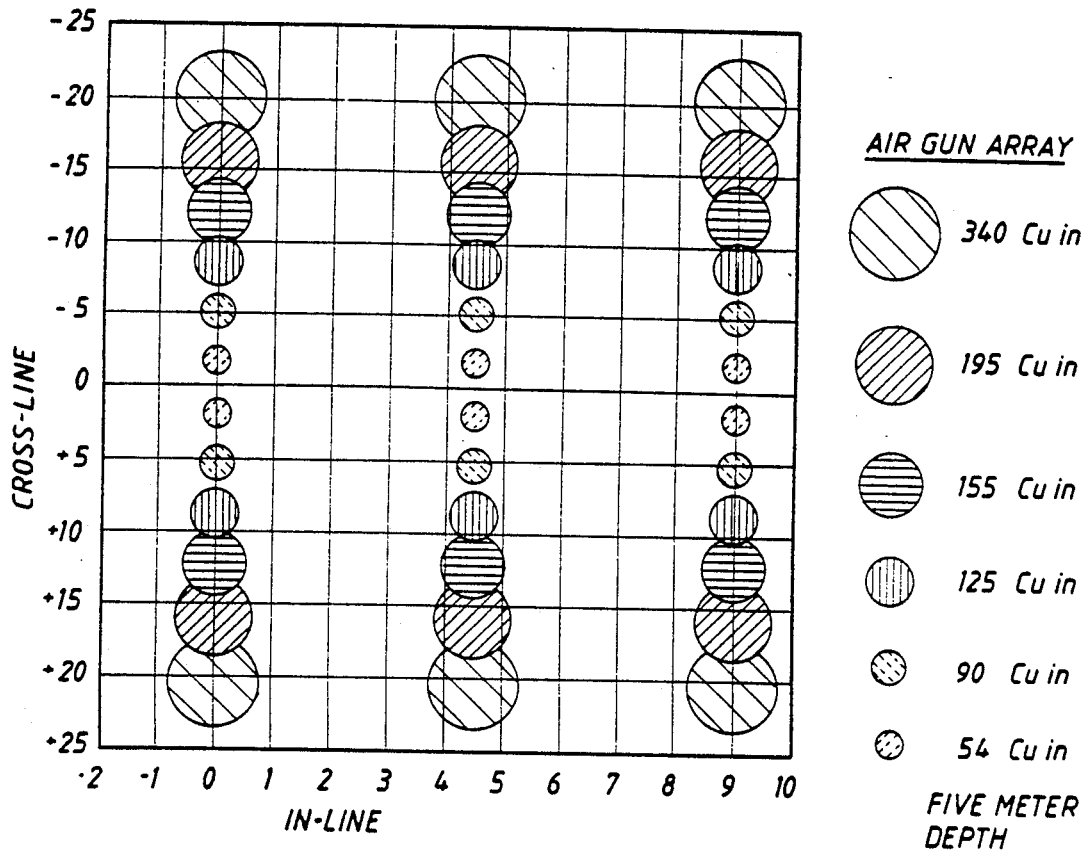
FIG. 12 depicts an array of the present invention.

FIG. 12 shows an array configuration of six various gun sizes used to evaluate the method of phase control to the present invention. Each linear subarray consists of 3 elements of one type (or size) and all twelve subarrays employ an element spacing of 4.5 meters. These twelve linear subarrays, are arranged in a parallel manner, i.e. all are aligned along (parallel to) the in-line direction. Note that subarrays employing the same element (identical elements) are symmetrically spaced about the in-line direction; for example, the two subarrays employing 340 cubic inch (chamber volume) guns are located at +20 and −20 meters from the "center" (zero on the cross-line axis) or axis of symmetry (which is parallel to the in-line direction) of the array.

Figure 13:
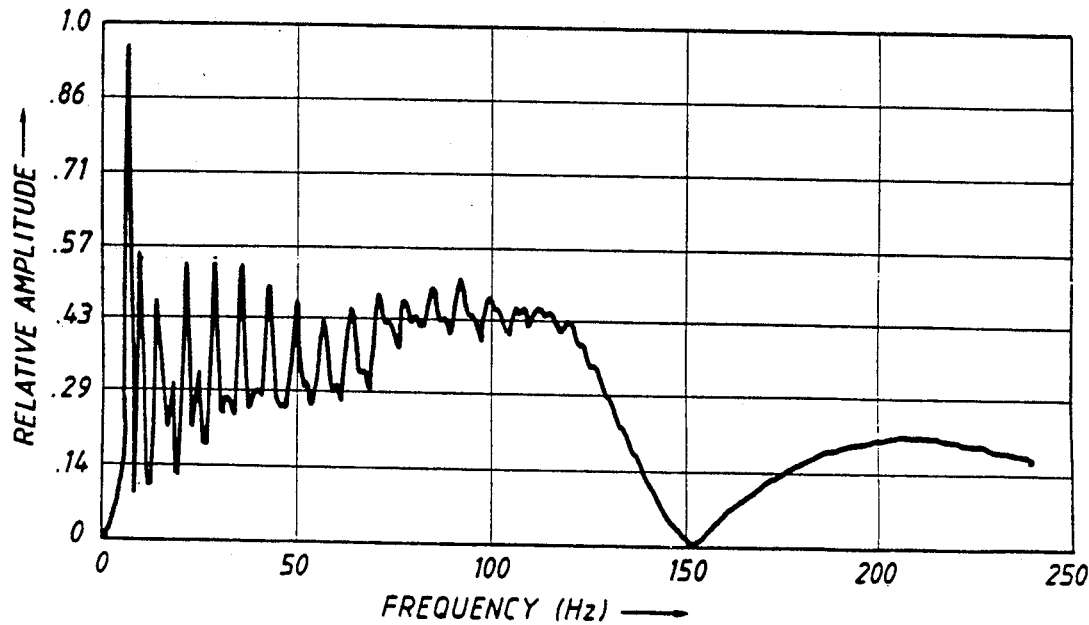
FIG. 13 depicts the far-field vertically downgoing amplitude spectra for the array of FIG. 12, with inter-element interaction.
Figure 14:
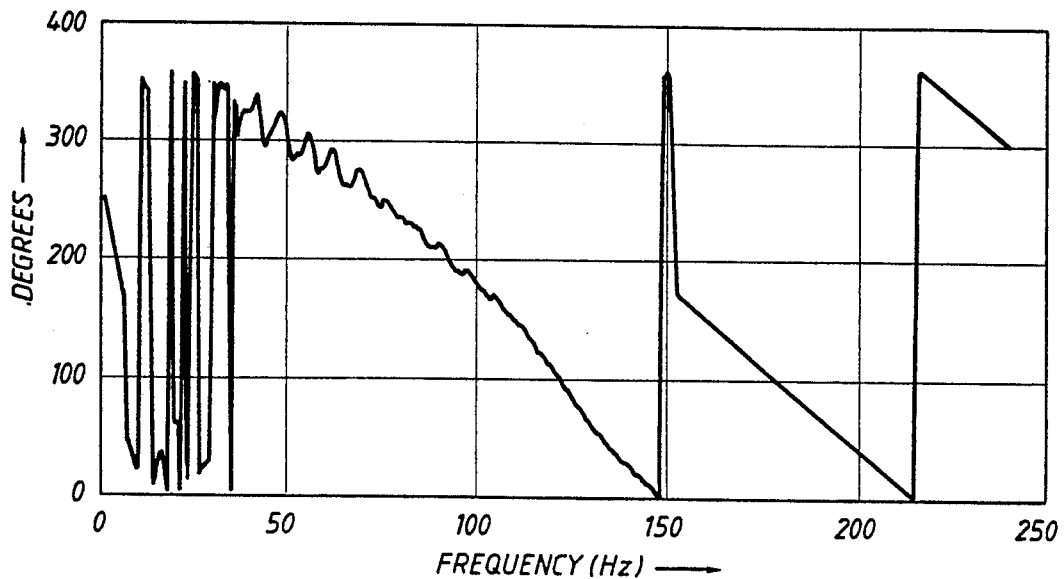
FIG. 14 depicts the far-field vertically downgoing phase spectra for the array of FIG. 12, with inter-element interaction.
Figure 15:
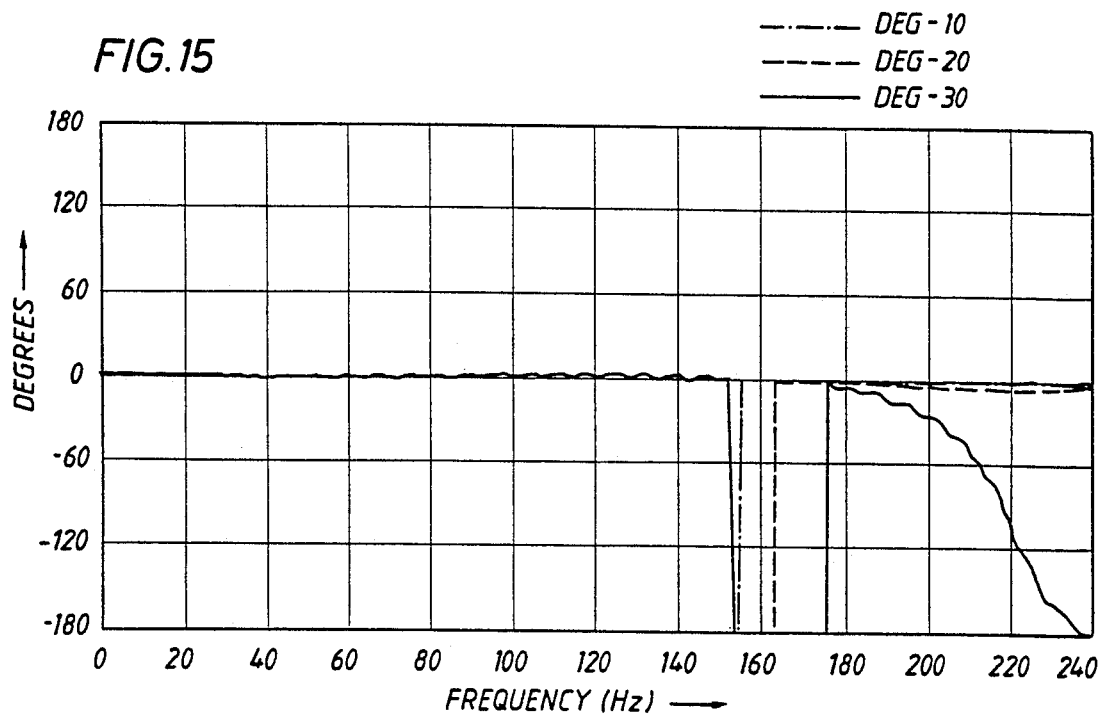
FIG. 15 depicts the phase error for selected incidence angles for the array of FIG. 12, with inter-element interaction.

A commercially available computer program was used to generate the notional waveforms (with inter-element interactions included) from the individual elements of FIG. 12. Equation 24 is used to calculate the vertically downgoing pulse's amplitude and phase spectra which are shown in FIGS. 13 and 14. Note, that the resulting array amplitude spectra depicted in FIG. 13 is not "smooth", but is very "spiky", as the guns are spaced far enough apart to avoid broadening their respective frequencies to cause a more smooth amplitude spectra. However, the desired array amplitude is a "smooth" curve which is typically achieved by moving the elements together a sufficient amount to broaden the individual spectra enough to provide a "smooth" composite array amplitude curve. The null in the amplitude spectra at 152 Hz correspond to the "ghost-notch" for the 5 meter depth. The 180° phase flip on FIG. 14 accompanies this zero crossing. Equation 24 is then used to calculate the phase spectra for emergence angles of 10°, 20° and 30° with the phase errors being provided in FIG. 15. FIG. 15 shows that the phase error for incidence angles of 10°, 20° and 30° is virtually zero for all frequencies out to 152 Hz. This is the phase flip associated with the depth of the guns.

To control the phase spectrum in the cross-line direction, the elements within any particular cross-line subarray should radiate the same or nearly the same outgoing waveform, in a manner similar to that described hereinbefore for the in-line direction.

Figure 16:
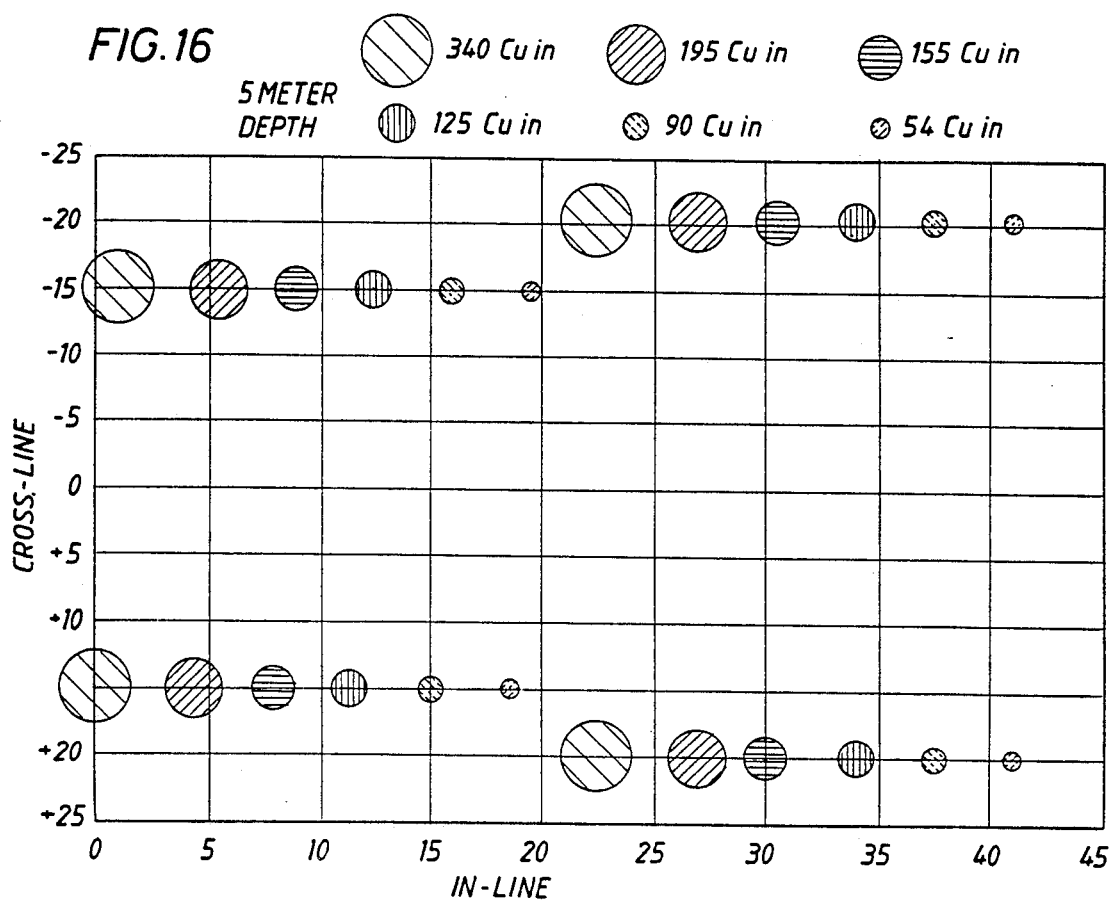
FIG. 16 depicts a conventional array.
Figure 17:
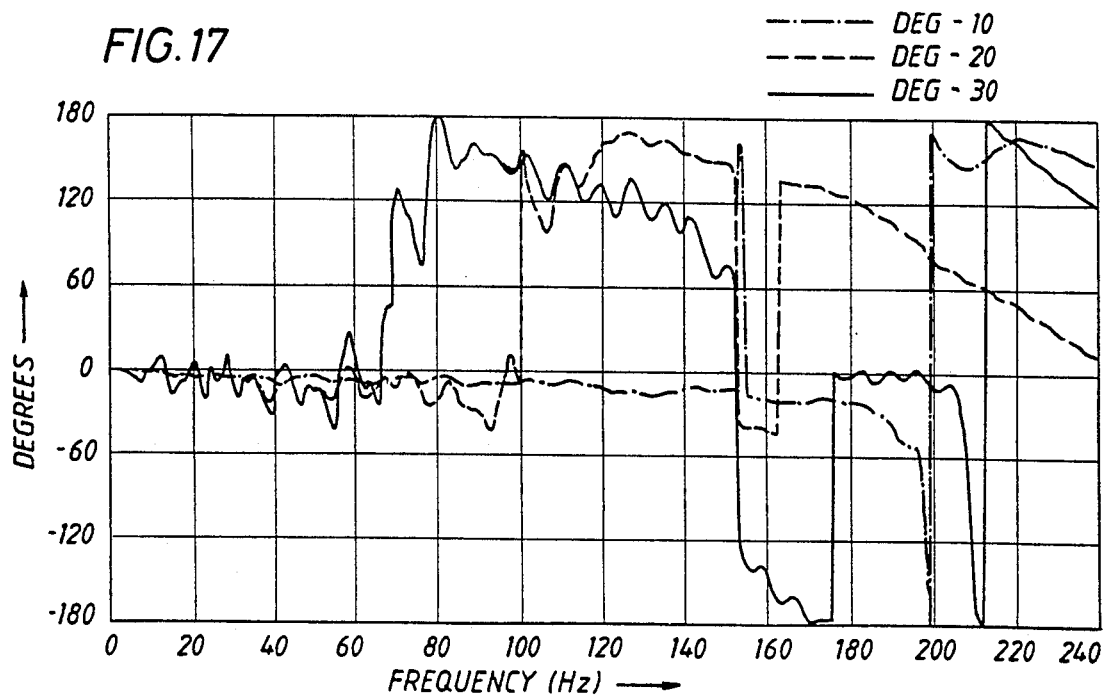
FIG. 17 depicts the phase error for selected incidence angles for the array of FIG. 16, with inter-element interaction.
Figure 20:
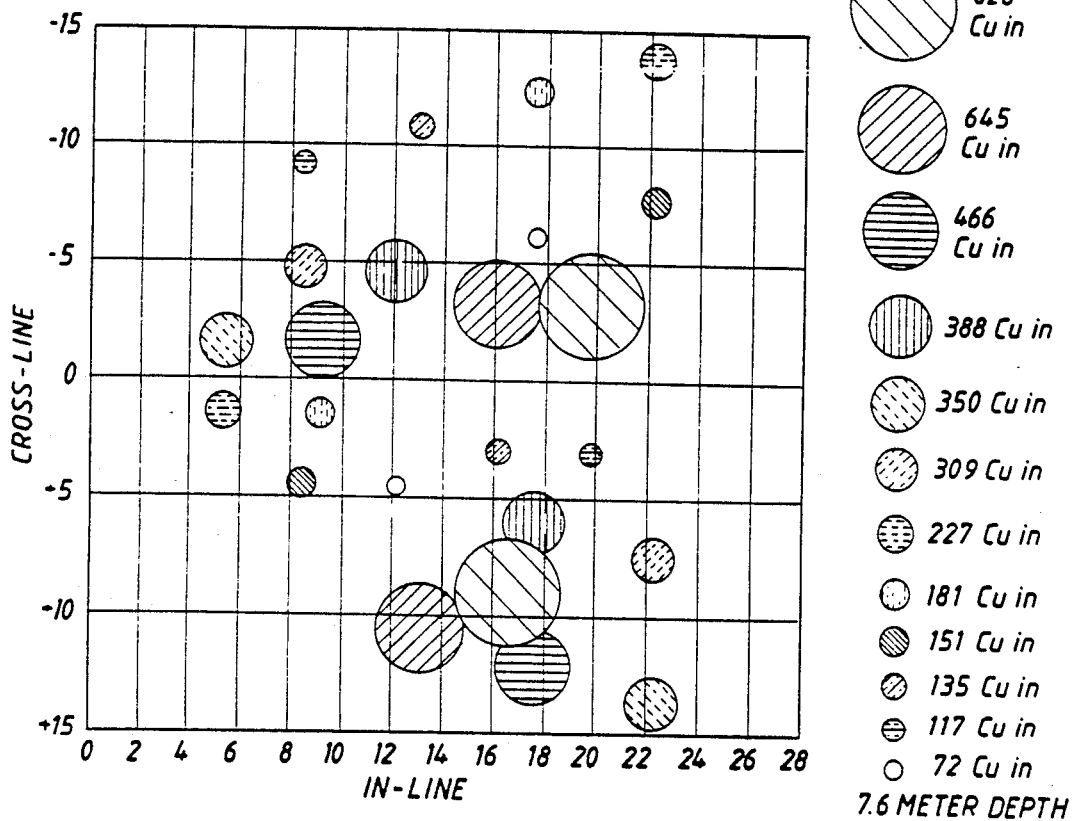
FIG. 20 depicts an additional conventional array.
Figure 21:
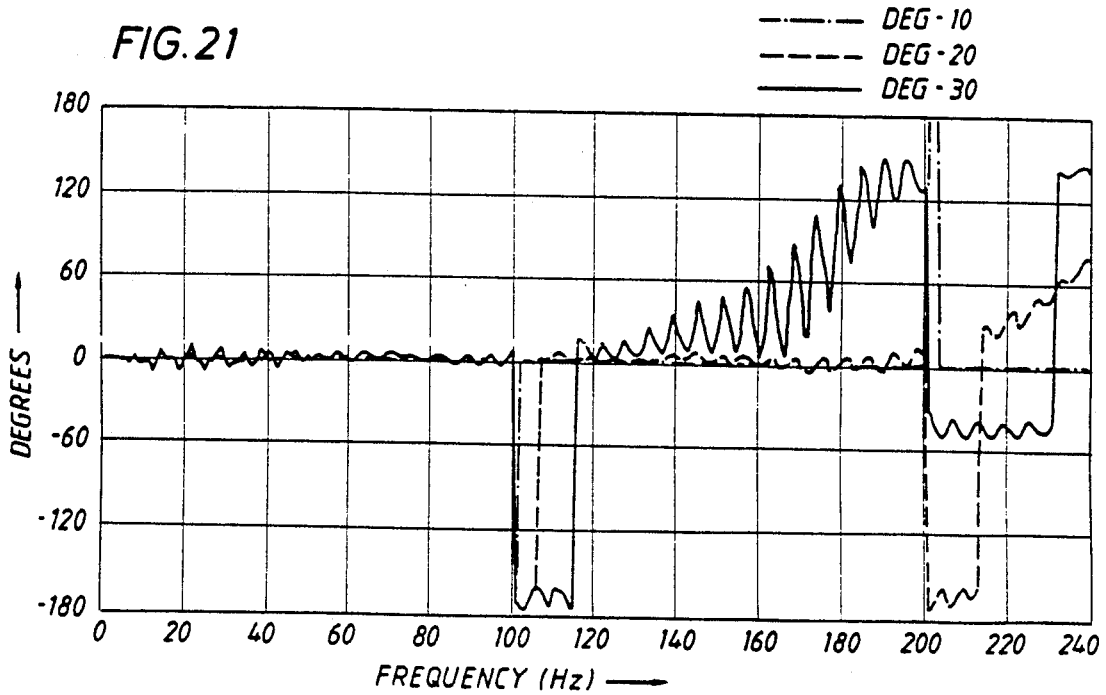
FIG. 21 depicts the phase error for selected incidence angles for the array of FIG. 20, with inter-element interaction.
Figure 22:
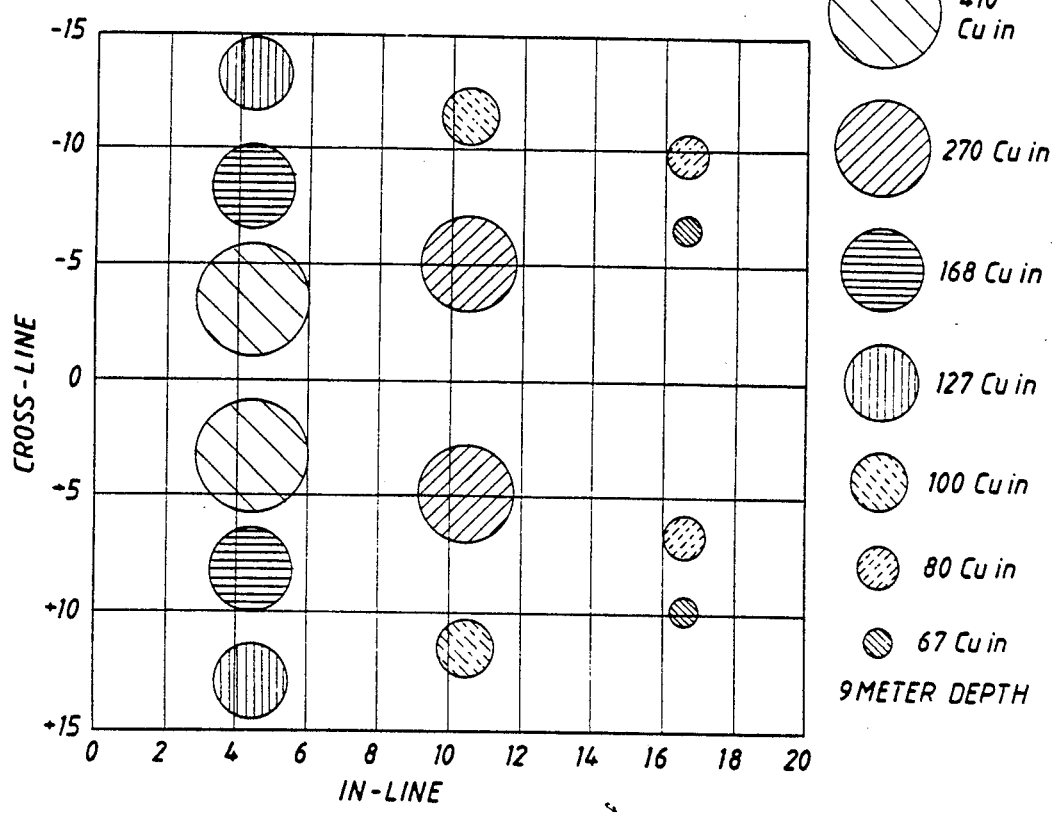
FIG. 22 depicts yet another conventional array.
Figure 23:
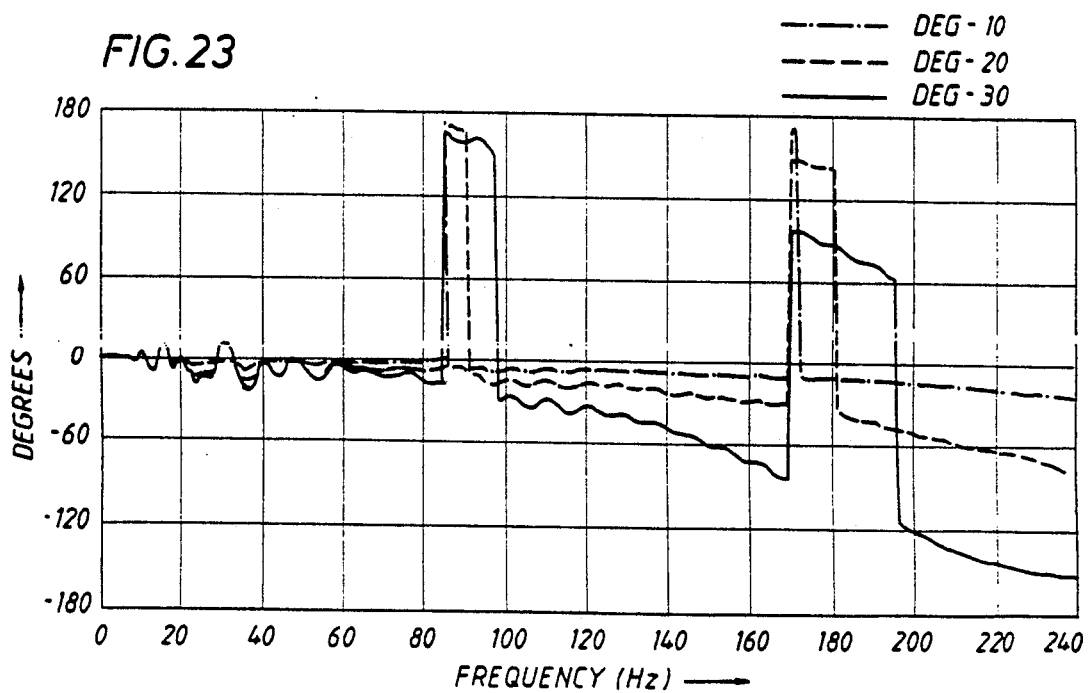
FIG. 23 depicts the phase error for selected incidence angles for the array of FIG. 22, with inter-element interaction.

To compare the phase control of arrays of the present invention with that of conventional arrays, the phase control of several conventional arrays will be examined. More particularly, FIGS. 16, 18, 20 and 22 depict the configurations (element size and spacing) of a conventional array and FIGS. 17, 19, 21 and 23 depict the phase errors for each respective array. The array of FIG. 16 employs the same six gun sizes as the array of the present invention depicted in FIG. 12. In FIG. 16, four identical linear subarrays, with each subarray containing all six gun sizes, are arranged in a symmetrical manner about the "center" of the array, with about the same cross-line width as the array of FIG. 12 and with an in-line length of about four times that of the array of FIG. 12. As may be seen from FIG. 17, the phase control of this array is virtually non-existent. The array of FIG. 18 employs eight gun sizes, with a larger "big" gun than the arrays of FIGS. 12 and 16. In FIG. 18, two sets of two identical, linear subarrays, with each subarray containing six gun sizes, are very roughly towed in a parallel manner with a cross-line width of about that of FIG. 12 and an in-line length of about twice that of FIG. 12. FIG. 20 and 22 depict different arrangements of different gun sizes. The array of FIG. 20 is not symmetrical while that of FIG. 22 does exhibit some symmetry. The random array of FIG. 20 seems to have the best phase control, but does not match the phase control of the array of FIG. 12. As may be seen, clearly the arrays of the present invention (FIG. 15) provide phase control not found in conventional arrays (FIGS. 17, 19, 21, and 23).

Thus, in summary, the methods of the present invention and the arrays of the present invention may employ more elements in the cross-line direction to control phase in an in-line direction, and vice versa. Further, to avoid phase flips from an array factor of a subarray before the ghost-notch frequency, the element spacing and number of elements in a subarray must meet certain criteria, i.e. their product is less than some value functionally related to depth (or ghost-notch frequency) and the highest incidence angle of interest (or some maximum incidence angle).

The methods of the present invention and the arrays of the present invention may also employ "mixed" subarrays; that is, subarrays may have different types and numbers of elements, when a particular type of element radiates narrow band radiation that "fills in" a portion of the total radiated bandwidth. Further, such mixed subarrays may physically overlap. For example, a two element subarray may overlay a three element subarray; provided there is enough spacing between the three elements to allow the two elements to fit between the three and not cause any major interactions therebetween.

Thus, by employing small but different numbers of elements in the subarrays, mixed subarrays may be employed in the arrays of the present invention. For these "mixed" subarray cases, the element spacing between subarrays will remain symmetrical about the subarray center, but does not have to be the same for all subarrays. For this case the subarrays do not all have to have the same length. However, the spacing for each identical element must be the same and be symmetrical relative to the array's geometric centroid regardless of the subarray in which the element is located. Further, the spacing and number of a particular type of element must be the same for any subarray within the array and the product of each element and its spacing must satisfy the design criterion established in FIG. 11.

Figure 24:
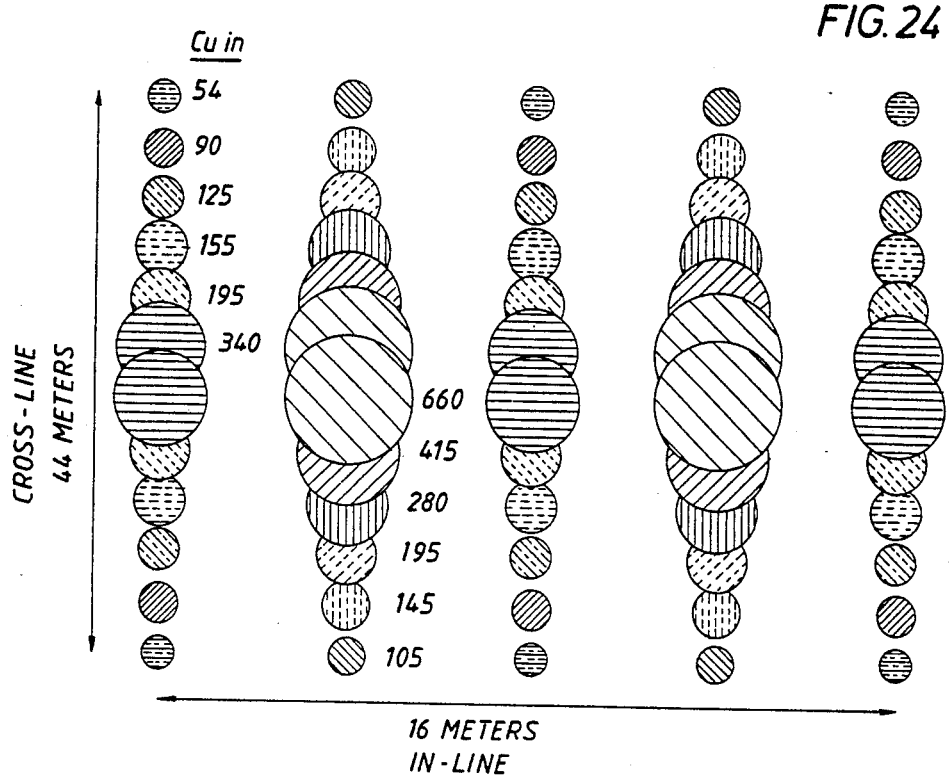
FIG. 24 depicts a large areal array of the present invention providing phase control for incidence angles up to about 30 degrees.
Figure 25:
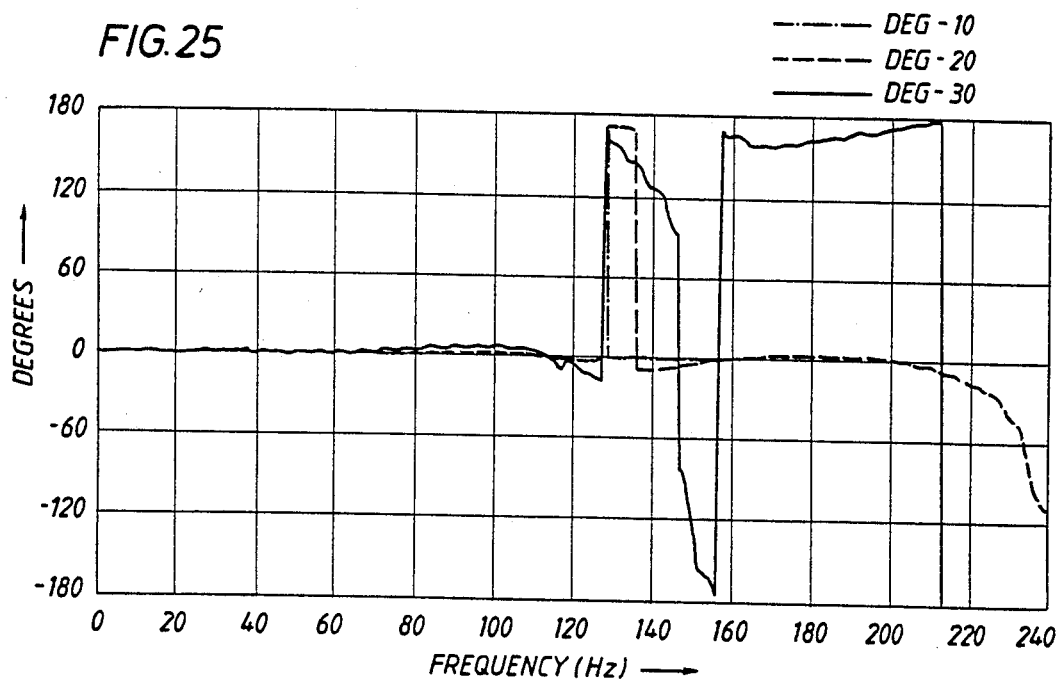
FIG. 25 depicts the phase error for selected incidence angles for the array of FIG. 24, with inter-element interaction.

FIG. 24 depicts a large array (16 meters long in the in-line direction and 44 meters wide in the cross-line direction) of the present invention having twelve mixed linear subarrays arranged in a parallel manner. Each in-line subarray contains two different types of element, i.e. two different gun sizes. That is, there is a three element linear subarray overlaying a two element linear subarray, or equivalently a subarray containing two types of elements with identical elements having identical spacing. The spacing between adjacent elements is 4 meters in each subarray and the spacing between a particular type of element (or identical elements) is 8 meters in each subarray. The array factor for the three element subarrays in each subarray goes to zero at the ghost-notch frequency when the incidence angle is 30°. FIG. 25 depicts the phase error for the array for 10, 20, and 30 degrees, for an operating depth of 6 meters. There is a very slight error present as the frequency approaches the ghost-notch frequency.

Figure 26:
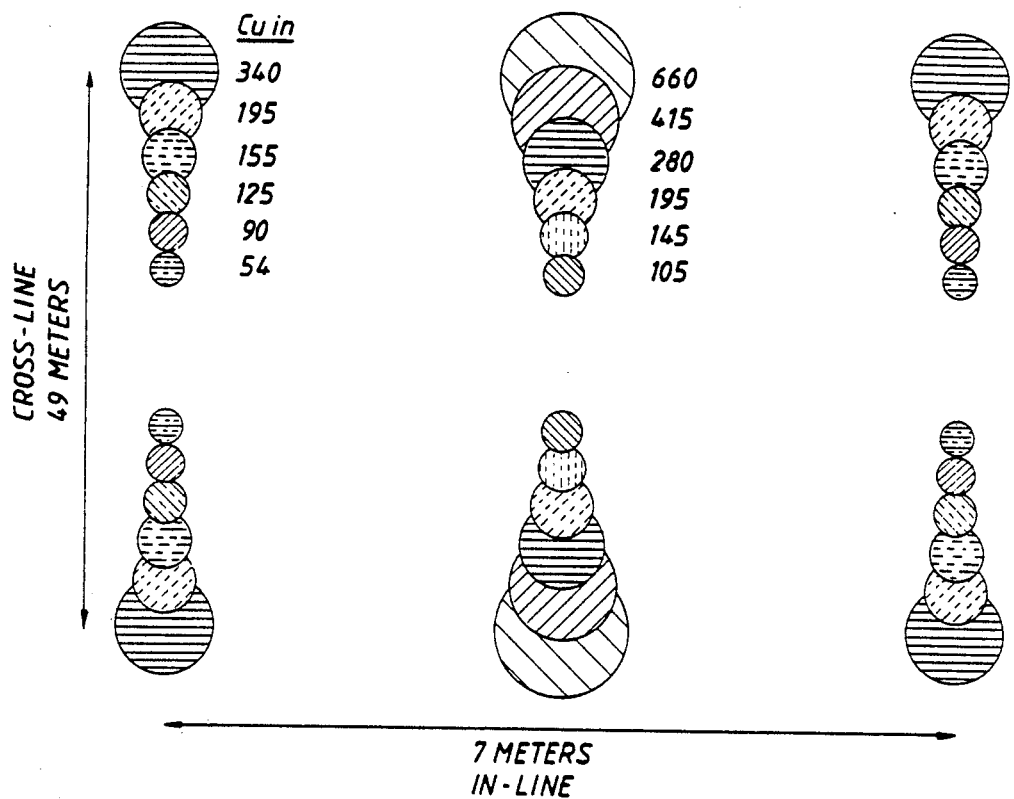
FIG. 26 depicts a different areal array of the present invention providing phase control for incidence angles up to about 30 degrees.
Figure 27:
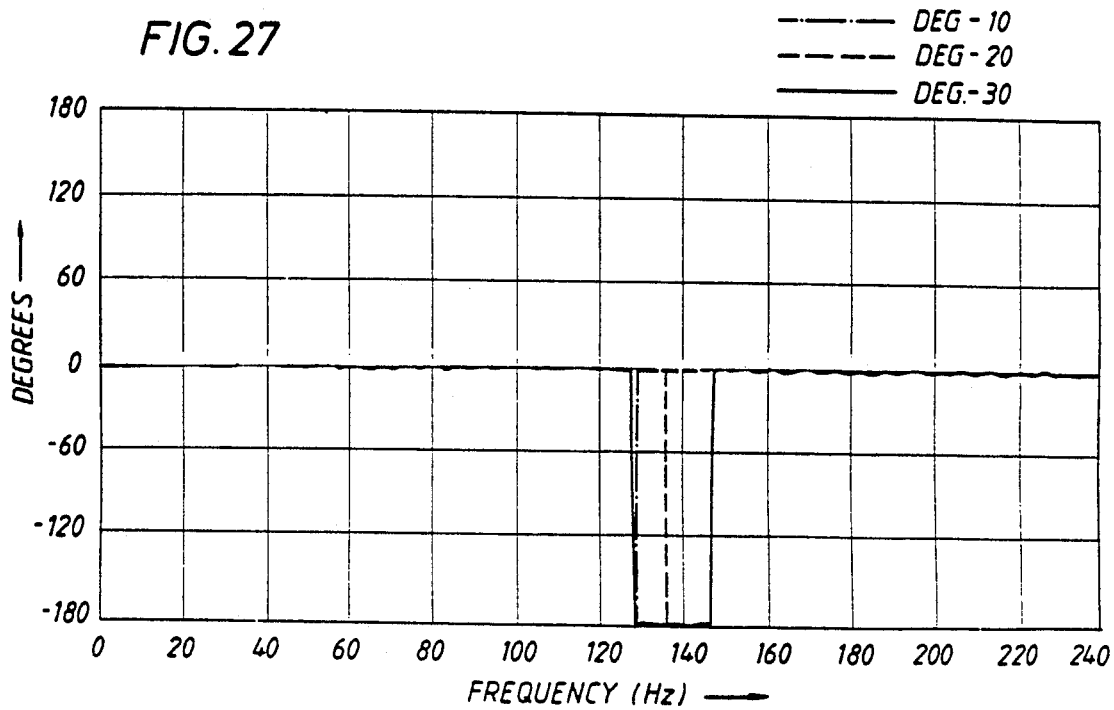
FIG. 27 depicts the phase error for selected incidence angles for the array of FIG. 26, with inter-element interaction.

FIG. 26 depicts a smaller mixed array (7 meters long in the in-line direction and 49 meters wide in the cross-line direction) of the present invention, with twelve linear subarrays arranged in a parallel manner. Each subarray contains two different types of elements with one of the element types being positioned at the "center" of the in-line dimension of the subarray, while the other element type has its two members positioned symmetrically about the "center" of the subarray. FIG. 27 depicts the phase error again for incidence angles of 10, 20, and 30 degrees, for an operating depth of 6 meters. For this array the phase error is virtually zero for all the incidence angles.

Figure 28:
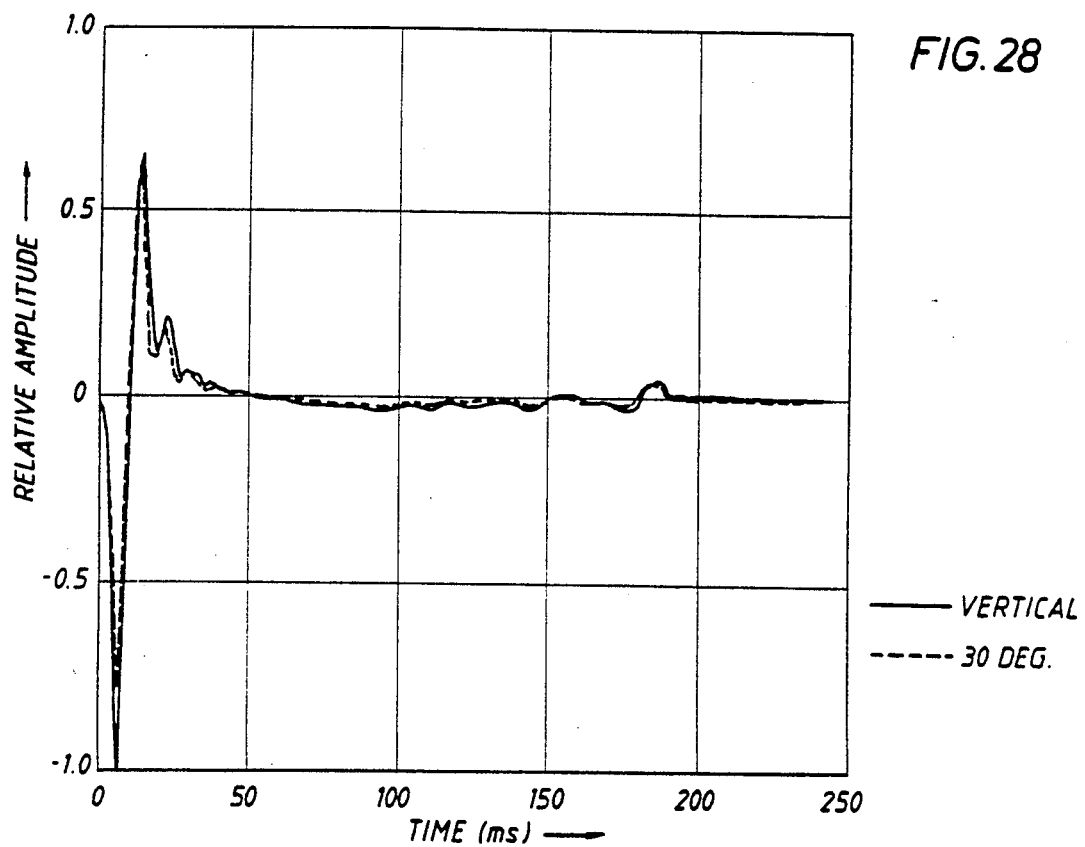
FIG. 28 depicts recorded source array pulses for the array of FIG. 26 for the vertically downgoing direction and an emergence angle of 30 degrees.
Figure 29:
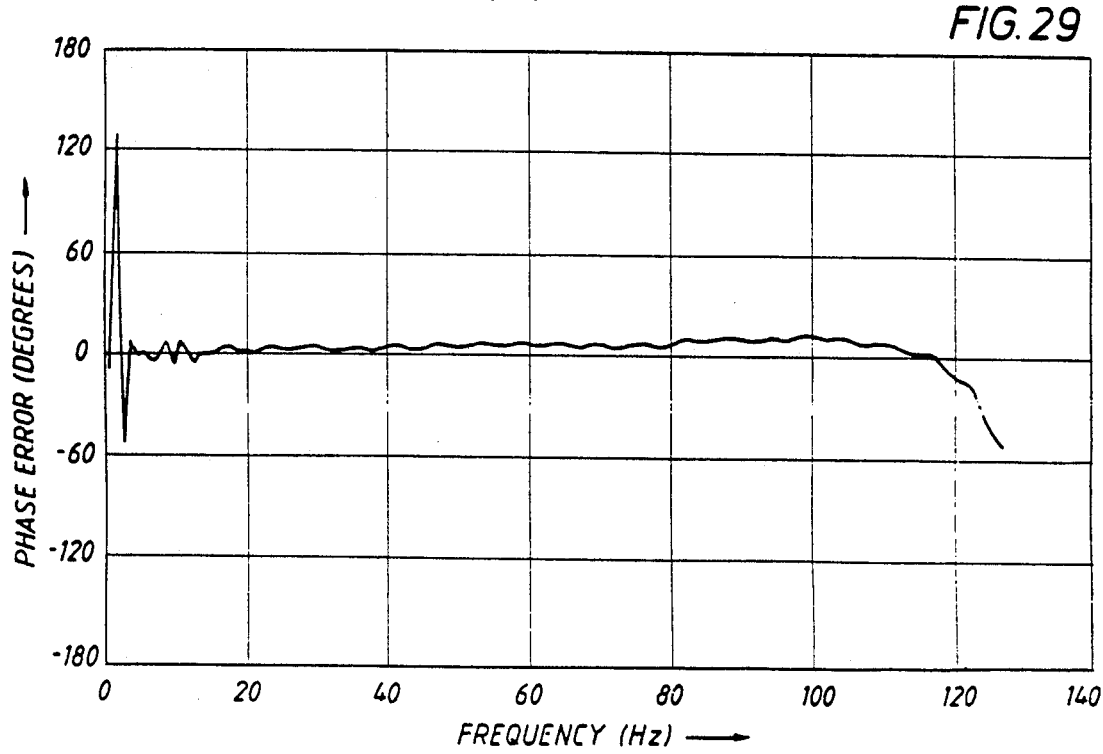
FIG. 29 depicts the phase error between the phase spectra associated with the two pulses of FIG. 28.

FIG. 28 depicts recorded signature data for the array shown in FIG. 26. The two pulses are for the vertically downgoing direction (recorded at a depth of about 157.5 meters) and an incidence angle of about 30° (recorded at a depth of about 187 meters). FIG. 29 depicts the phase error between these pulses out to about the ghost-notch frequency. There is very little error except at about 2 Hertz. The 2 Hz error cannot be explained in terms of the theory presented here (see FIG. 27). It may be due to some directionally dependent noise being radiated from the vessel. However, the match between the two phase spectra is quite good except for the error at the very low frequencies (2 Hz).

Figure 30:
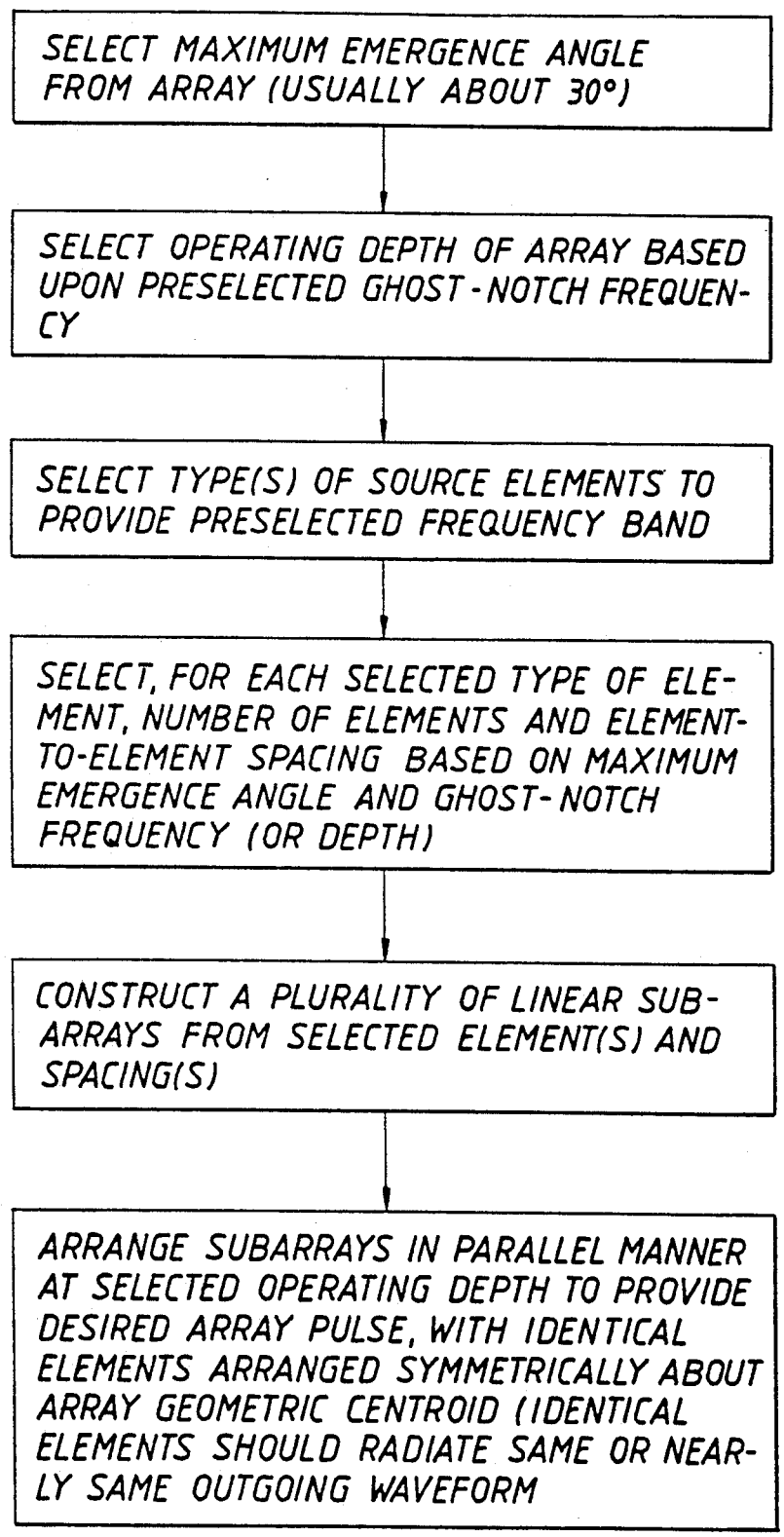
FIG. 30 depicts the preferred steps of the method of the present invention.

FIG. 30 depicts the steps of the presently preferred method of the present invention. The methods of the present invention initially select the maximum emergence (or incidence) angle of interest (usually the maximum angle of emergence from the array is about 30 degrees), and the depth of operation of the sources for the array. Next the type (or types) of individual source elements are selected to provide the desired or preselected frequency band. Then for each selected type of element, the methods select the number of subarray elements and their spacing based upon the ghost-notch frequency (or depth) and maximum incidence angle (for which phase control is desired), and then construct a plurality of linear subarrays. That is, the spacing for and number of identical elements selected is functionally related to a maximum incidence angle and depth (ghost-notch frequency), as described herein before. These subarrays are then arranged so that their individually radiated pressure fields provide a composite array pulse of acceptable bandwidth, peak-to-peak amplitude, and peak-to-bubble ratio along some preferred direction (typically vertically downgoing). Identical elements are arranged symmetrically about the array's geometric centroid and radiate the same or nearly the same outgoing waveform.

The foregoing discussion has been for an array to be employed to acquire so-called "2D" seismic data. That is, data is acquired along a seismic line and is then used to construct an image of the earth that corresponds to a "slice" made through the earth along that seismic line. The "image" of the earth thus has two dimensions (2D), the depth into the earth and the linear distance along the earth (the seismic line). For so-called "3D" seismic data, the "image" of the earth has three dimensions (3D) and represents a volume (rather than a slice) of the subsurface earth.

The arrays and methods of the present invention may be extended to 3D seismic acquisition techniques as well. This is accomplished by (in the simplest case) using identical (or approximately identical) elements arranged in a square, with the number of elements and spacing along a diagonal of the square satisfying equation 26. Preferably, broad band elements are used as identical elements in such a 3D array to provide a preselected array pulse. For square or non-square arrays, with non-identical elements, the extension of the present invention includes ensuring that the longest length of the array (generally a diagonal) and the number of each type of element and spacing for that element along that length satisfy equation 26. In addition, the element spacing and number of elements (for identical elements) in both the cross-line and in-line direction should satisfy equation 26. Further, identical elements are symmetrically (nearly symmetrically) spaced about both the in-line and cross-line direction. This will ensure that any phase flip is associated with the ghost-notch, rather than an array factor. Preferably, narrow band elements are used for 3D arrays employing non-identical elements and they are arranged to provide a preselected array pulse. In general, the smallest element sizes, which may employ smaller element spacings are placed along the diagonals and the larger element sizes are placed along the cross-line and in-line direction. For 3D arrays, the geometric centroid is a point about which the array is symmetrical in both the in-line and cross-line direction.

For 3D seismic acquisition techniques, the array constructed according to the foregoing described methods may not be "energetic" enough because the array factors may not allow a large enough array length to be employed. For such cases, several arrays of the present invention may be so constructed and then "stacked" at different depths to provide an overall array of sufficient energy; these "stacked" arrays may be "fired" in sequence from the shallower to deeper array to provide an additive phase to the downgoing pulse. In general, this means that each $\Lambda_m(f)$ of equation (22) may have its own separate depth $d_m$, which may vary from subarray to subarray, but the variation in X direction is as noted earlier herein. For such "stacked" arrays the ghost-notch frequency of the deepest array is the frequency up to which phase control is provided.

Many other variations and modifications may be made in the apparatus and techniques hereinbefore described, by those having experience in this technology, without departing from the concept of the present invention. Accordingly, it should be clearly understood that the apparatus and method depicted in the accompanying drawings and referred to in the foregoing description are illustrative only and are not intended as limitations on the scope of the invention.

What is claimed is:

1. A linear subarray for use in a marine seismic source array, said linear subarray having a preselected operating depth and comprising a selected number of at least one identical element arranged in a symmetrical manner about the array's geometric centroid, with each of said identical elements radiating the same or nearly the same outgoing waveform and being located approximately at said preselected operating depth, and with the number of identical elements and the spacings for such elements being functionally related to a preselected maximum incidence angle and said preselected operating depth of the subarray.

2. The subarray of claim 1, wherein said at least one identical element comprises a broad band source element.

3. The subarray of claim 1, wherein said at least one identical element comprises a narrow band source element.

4. The subarray of claim 1, wherein said at least one identical element comprises an airgun, watergun, marine vibrator, or combinations thereof.

5. The subarray of claim 1, wherein said at least one identical element is one size.

6. The subarray of claim 1, wherein said preselected maximum incidence angle is 30°.

7. The subarray of claim 1, wherein said functional relationship between said spacing for and number of identical elements, and said preselected maximum incidence angle and said preselected operating depth is given by, $$K\Delta = \frac{2d}{\sin\theta}$$

where k is the number of elements, $\Delta$ is the element spacing in meters, d is the preselected operating depth in meters and $\theta$ is the preselected maximum incidence angle in degrees.

8. The subarray of claim 1, wherein the actual operating depth of at least one element of such subarray is different from said preselected operating depth.

9. A marine seismic array comprising:
at least one linear subarray having a preselected operating depth and containing a selected number of at least one identical element arranged in a symmetrical manner about the array's geometric centroid, with each of said identical elements radiating the same or nearly the same outgoing waveform and having an actual operating depth approximately at said preselected operating depth, with the number of said identical elements and the spacings for such elements being functionally related to a preselected maximum incidence angle and said preselected operating depth.

10. The array of claim 9, wherein the actual operating depth of at least one element of said at least one linear subarray is different from said preselected operating depth.

11. The array of claim 9, wherein said array comprises a plurality of linear subarrays arranged in a parallel manner.

12. The array of claim 11, wherein said plurality of linear subarrays have diagonal element spacing and maximum number of elements along said diagonal based upon a preselected maximum incidence angle and said preselected operating depth and with each subarray containing at least one type of source element, with each type of source element radiating the same or nearly the same outgoing waveform and with each type of source element of each subarray being arranged in a symmetrical manner about the array's geometric centroid for both in-line and cross-line directions.

13. The array of claim 11, wherein said plurality of linear subarrays comprises twelve linear subarrays, with each subarray comprising three identically sized elements spaced apart a first fixed distance and with pairs of subarrays employing the same element spaced a symmetrical distance from an in-line direction.

14. The array of claim 13, wherein said at least one identical element comprises six different sized elements.

15. The array of claim 14, wherein said six different sized elements are air guns having six different chamber volumes.

16. The array of claim 11, wherein said plurality of subarrays comprises twelve linear subarrays, with each subarray comprising two or more different sized elements spaced apart a first fixed distance and with pairs of subarrays employing identical elements spaced a symmetrical distance from an in-line direction.

17. The array of claim 16, wherein said first fixed distance is 5 meters or less.

18. The array of claim 16, wherein said at least one identical element comprises eight different sized elements.

19. The array of claim 18, wherein said eight different sized elements are air guns having eight different chamber volumes.

* * * * *